United States Patent
Lee et al.

(10) Patent No.: US 11,262,445 B2
(45) Date of Patent: Mar. 1, 2022

(54) METHOD AND DEVICE FOR TRANSMITTING AND RECEIVING DATA VIA UWB IN WIRELESS COMMUNICATION SYSTEM

(71) Applicant: SAMSUNG ELECTRONICS CO., LTD., Suwon-si (KR)

(72) Inventors: Mingyu Lee, Suwon-si (KR); Seongah Jeong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/706,153

(22) Filed: Dec. 6, 2019

(65) Prior Publication Data
US 2020/0182996 A1 Jun. 11, 2020

(30) Foreign Application Priority Data
Dec. 7, 2018 (KR) .................. 10-2018-0157482

(51) Int. Cl.
| G01S 13/76 | (2006.01) |
| G01S 13/78 | (2006.01) |
| G01S 5/02 | (2010.01) |
| H04B 1/7163 | (2011.01) |
| G01S 13/02 | (2006.01) |

(52) U.S. Cl.
CPC .......... G01S 13/765 (2013.01); G01S 5/0284 (2013.01); G01S 13/0209 (2013.01); G01S 13/785 (2013.01); H04B 1/7163 (2013.01)

(58) Field of Classification Search
CPC ........ G01S 13/76; G01S 13/765; G01S 13/78; G01S 13/02; G01S 13/0284; G01S 13/0209; H04B 1/7163
See application file for complete search history.

(56) References Cited

U.S. PATENT DOCUMENTS

| 9,232,505 B2 | 1/2016 | Oh et al. |
| 9,826,376 B2 | 11/2017 | Rudolf et al. |
| 2010/0278060 A1 | 11/2010 | Lee et al. |
| 2018/0091285 A1* | 3/2018 | Hosseini ............... H04L 5/1469 |
| 2018/0213492 A1 | 7/2018 | Xia |

(Continued)

FOREIGN PATENT DOCUMENTS

| KR | 10-1122416 B1 | 3/2012 |
| KR | 1020140008239 A | 1/2014 |

OTHER PUBLICATIONS

Naguib, A. (Apple), et al., "MAC for Secure Ranging", Project: IEEE P802.15 Working Group for Wireless Personal Area Networks (WPANs), Nov. 12, 2018, slides 1-14, 14 pages (Year: 2018).*

(Continued)

*Primary Examiner* — Jinsong Hu
*Assistant Examiner* — Farideh Madani
(74) *Attorney, Agent, or Firm* — Sughrue Mion, PLLC

(57) ABSTRACT

An operation method of an electronic device for transmitting and receiving data through an ultra wideband (UWB) in a wireless communication system includes: transmitting, to another electronic device, a first ranging control message; transmitting, to the other electronic device, a ranging start message based on the first ranging control message; and receiving, from the other electronic device, a ranging response message based on the first ranging control message.

16 Claims, 34 Drawing Sheets

(56) References Cited

U.S. PATENT DOCUMENTS

| | | | |
|---|---|---|---|
| 2018/0234797 A1* | 8/2018 | Ledvina | B60R 25/24 |
| 2020/0062217 A1* | 2/2020 | Ledvina | H04L 63/18 |
| 2020/0304970 A1* | 9/2020 | Jiang | G01S 5/0205 |

OTHER PUBLICATIONS

International Search Report and Written Opinion issued by the International Searching Authority dated Mar. 12, 2020 in the International Application No. PCT/KR2019/017233.
Naguib, A. (Apple), et al., "MAC for Secure Ranging", Project: IEEE P802.15 Working Group for Wireless Personal Area Networks (WPANs), Nov. 12, 2018, slides 1-14, 14 pages.
"802.15.8-2017—IEEE Standard for Wireless Medium Access Control (MAC) and Physical Layer (PHY) Specifications for Peer Aware Communications (PAC)", IEEE Std. 802.15.8TM-2017, IEEE Standard, IEEE, Feb. 7, 2018, 323 pages.
Jeong, S., et al., "Inclusion of Multicast/Broadcast Ranging in Information Element", Project: IEEE P802.15 Working Group for Wireless Personal Area Networks (WPANS), Nov. 13, 2018, slides 1-16, 16 pages.
Billy Verso: "Draft text covering two way ranging mechanisms, procedures and messages", IEEE, Nov. 15, 2018, XP068133738, pp. 1-24 (24 pages total).
Communication dated Sep. 24, 2021, from the European Patent Office in European Application No. 19893502.5.

\* cited by examiner

FIG. 5

| Class 0 Payload IE ID (4 bit) (420) | Class 0 Payload IE Content (0/8 bytes) (430) | Abbreviation |
|---|---|---|
| 0 | Payload IE list terminator | |
| 1 | Ranging Request Reply Time IE | RRRT IE (501) |
| 2 | Ranging Reply Time Instantaneous IE | RRTI IE (502) |
| 3 | Ranging Reply Time Deferred IE | RRTD IE (503) |
| 4 | Ranging Preferred Reply Time IE | RPRT IE (504) |
| 5 | Ranging Control Double-sided TWR IE | RCDT IE (505) |
| 6 | Ranging Round Trip Measurement IE | RRTM IE (506) |
| 7 | Ranging Time-of-Flight IE | RTOF IE (507) |
| 8 | Interaction Time Adjustment IE | ITA IE (508) |
| 9 to 15 | Reserved | |

FIG. 6

| Control Info Value (Octets: 1) (600) | MEANING |
|---|---|
| 0 (610) | This frame is initiating DS-TWR and indicates that the initiating end does not require the ranging result |
| 1 (611) | This frame is initiating DS-TWR and requesting that the ranging result is sent back at end of exchange |
| 2 (612) | This frame is continuing the DS-TWR, forming the request for the 2nd TX-to-RX round-trip measurement |

FIG. 15A

| Bits: 0 | 1 | 3-4 | 5 | | | | | | | |
|---|---|---|---|---|---|---|---|---|---|---|
| Poll Mode (1501) | Secure Mode (1502) | Cast Mode (1503) | Ranging Mode (1504) | Pointer to next Ranging Control (RC) (1505) | Number of Slots (1506) | Length of Slot (1507) | [TBD] (Variable & only if cast mode = 11) Slot Allocation (1508) | Channel Number (1509) | Preamble Code Index (1510) | Period between Rounds (1511) |
| 0: Controller 1: Controlee | 0: Normal 1: Secure | 00: Unicast 01: Broadcast 10: Multicast-Contention 11: Multicast-Scheduled | 0: SS-TWR 1: DS-TWR | Time (10us) | [TBD] | Time (10us) | [TBD] | [TBD] | [TBD] | [TBD] |

FIG. 15B

| Poll Mode (PM) | Secure Mode (SM) | Cast Mode (CM) | Multicast Mode (MM) | Ranging Mode (RM) | Ranging Interval (RI) | Number of Slots (S_P_RS) | Length of Slot (S_LN) | Address /ID | Number of Ranging Sessions (N_RS) | Ranging Session Counter (RS_CNT) | Max number of Transmissions (N_MAX_TX) | Channel for Next Ranging Interval (CH_NEXT_RI) | Preamble for Next Ranging Interval (PR_NEXT_RI) | Period between Sessions (P_RS) |
|---|---|---|---|---|---|---|---|---|---|---|---|---|---|---|
| Bits: 1 | 1 | 2 | 1 | 1 | [TBD] | [TBD] | [TBD] | [TBD] | [TBD] | [TBD] | [TBD] | [TBD] | [TBD] | [TBD] |
| 0: Controller 1: Controlee | 0: Normal 1: Secure | 00: Unicast 01: Multicast 10: Broadcast 11: Many-to-Many | 0: Contention Based 1: Scheduled | 0: SS-TWR 1: DS-TWR | XX ms (or us) | #XX | XX ms (or us) | Applicable for CM=01 & MM=1, Address/ Group ID | #XX | 1 to N_RS | Applicable for CM=10, #XX | Channel Idex | Preamble Idex | XX ms (or us) |

FIG. 20A

| Bits: 0 | 1 | 3-4 | 5 | [TBD] | [TBD] | [TBD] | [TBD]<br>(Variable & only if cast mode = 11) | [TBD] | [TBD] |
|---|---|---|---|---|---|---|---|---|---|
| Poll Mode (2001) | Secure Mode (2002) | Cast Mode (2003) | Ranging Mode (2004) | Pointer to next Ranging Control (RC) (2005) | Number of Slots (2006) | Length of Slot (2007) | Slot Allocation (2008) | Channel Number (2009) | Preamble Code Index (2010) |
| 0: Controller | 0: Normal | 11: Multicast-Scheduled | 0: SS-TWR | 0x2710 | N+2 | 0x32 | 0x3250041592E535953 2E4444463031;<br>...<br>0x3250041592E535953 2E4444463054; | 0x09 | 0x03 |

FIG. 20B

| | Poll Mode (PM) | Secure Mode (SM) | Cast Mode (CM) | Multicast Mode (MM) | Ranging Mode (RM) | Ranging Interval (RI) | Number of Slots (S_P_RS) | Length of Slot (S_LN) | Address /ID | Number of Ranging Sessions (N_RS) | Ranging Session Counter (RS_CNT) | Max number of Transmissions (N_MAX_TX) | Channel for Next Ranging Interval (CH_NEXT_RI) | Preamble for Next Ranging Interval (PR_NEXT_RI) | Period between Sessions (P_RS) |
|---|---|---|---|---|---|---|---|---|---|---|---|---|---|---|---|
| Bits: | 1 | 1 | 2 | 1 | 1 | [TBD] | [TBD] | [TBD] | [TBD] | [TBD] | [TBD] | [TBD] | [TBD] | [TBD] | [TBD] |
| 0: Controller | 0: Normal | 01: Multicast | 1: Scheduled | 0: SS-TWR | 0x186A0 (us) | N+2 | 0x1F4 (us) | 0x3250415 92E535953 2E4444463 031; ... 0x3250415 92E535953 2E4444463 054; | 0x01 | 1 | - | 0x09 | 0x03 | 0xC350 (us) |

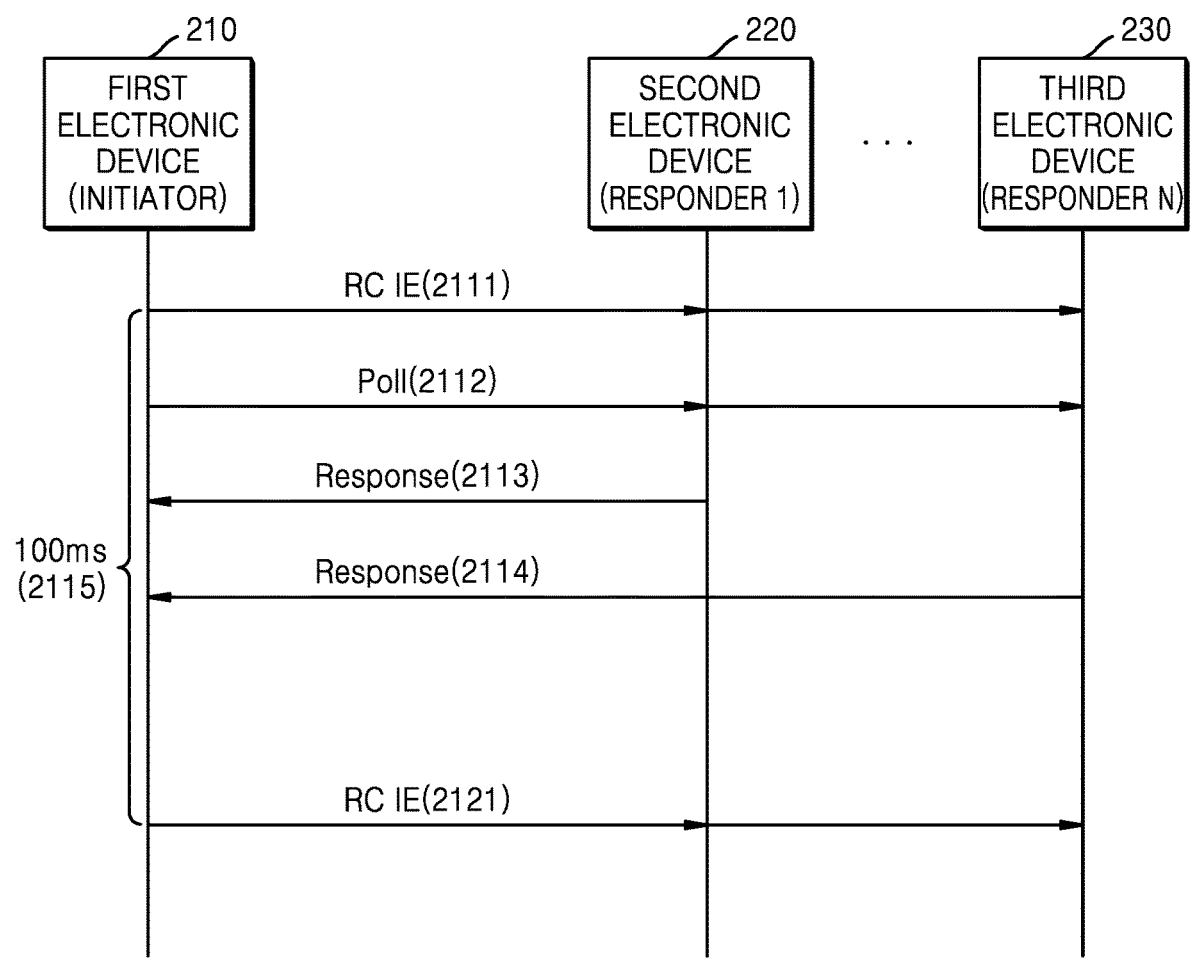

FIG. 22A

| Bits: 0 | 1 | 3-4 | 5 | [TBD] | [TBD] | [TBD] | [TBD] (Variable & only if cast mode = 11) | [TBD] | [TBD] |
|---|---|---|---|---|---|---|---|---|---|
| Poll Mode (2201) | Secure Mode (2202) | Cast Mode (2203) | Ranging Mode (2204) | Pointer to next Ranging Control (RC) (2205) | Number of Slots (2206) | Length of Slot (2207) | Slot Allocation (2208) | Channel Number (2209) | Preamble Code Index (2210) |
| 0: Controller | 0: Normal | 11: Multicast-Scheduled | 1: DS-TWR | 0x2710 | N+3 | 0x32 | 0x3250041592E535953 2E4444463031; ... 0x3250041592E535953 2E4444463054; | 0x09 | 0x03 |

FIG. 22B

| Poll Mode (PM) | Secure Mode (SM) | Cast Mode (CM) | Multicast Mode (MM) | Ranging Mode (RM) | Ranging Interval (RI) | Number of Slots (S_P_RS) | Length of Slot (S_LN) | Address /ID | Number of Ranging Sessions (N_RS) | Ranging Session Counter (RS_CNT) | Max number of Transmissions (N_MAX_TX) | Channel for Next Ranging Interval (CH_NEXT_RI) | Preamble for Next Ranging Interval (PR_NEXT_RI) | Period between Sessions (P_RS) |
|---|---|---|---|---|---|---|---|---|---|---|---|---|---|---|
| Bits: 1 | 1 | 2 | 1 | 1 | [TBD] | [TBD] | [TBD] | [TBD] | [TBD] | [TBD] | [TBD] | [TBD] | [TBD] | [TBD] |
| 0: Controller | 0: Normal | 01: Multicast | 1: Scheduled | 1: DS-TWR | 0x186A0 (us) | N+3 | 0x1F4 (us) | 0x3250415 92E535953 2E4444463 031; ... 0x3250415 92E535953 2E4444463 054; | 0x01 | 1 | - | 0x09 | 0x03 | 0xC350 (us) |

FIG. 24A

| Bits: | 0 | 1 | 3-4 | 5 | 2 | [TBD] | [TBD] | [TBD] | [TBD] | [TBD] | [TBD] | [TBD] | [TBD] |
|---|---|---|---|---|---|---|---|---|---|---|---|---|---|
| | Poll Mode (2401) | Secure Mode (2402) | Cast Mode (2403) | Ranging Mode (2404) | Time Unit for Pointer to next Ranging Control (RC) (2405) | Pointer to next Ranging Control (RC) (2406) | Number of Slots (2407) | Number of Slots (2408) | Length of Slot (2409) | [TBD] (Variable & only if cast mode = 11) Slot Allocation (2410) | Channel Number (2411) | Preamble Code Index (2412) | Period between Rounds (2413) |
| | 0: Controller 1: Controlee | 0: Normal 1: Secure | 00: Unicast 01: Broadcast 10: Multicast-Contention 11: Multicast-Scheduled | 0: SS-TWR 1: DS-TWR | 00: Time (10us) 01: Length of Slot 10: Length of Round 11: Reserved | Time OR Value for Multiplying with Length of Slot OR Length of Round | [TBD] | [TBD] | Time (10us) | [TBD] | [TBD] | [TBD] | [TBD] |

FIG. 24B

| Poll Mode (PM) | Secure Mode (SM) | Cast Mode (CM) | Multicast Mode (MM) | Ranging Mode (RM) | Ranging Interval (RI) | Time unit for RI (RI) | Ranging Interval (RI) | Number of Slots (S_P_RS) | Length of Slot (S_LN) | Address /ID | Number of Ranging Sessions (N_RS) | Ranging Session Counter (RS_CNT) | Max number of Transmissions (N_MAX_TX) | Channel for Next Ranging Interval (CH_NEXT_RI) | Preamble for Next Ranging Interval (PR_NEXT_RI) | Period between Sessions (P_RS) |
|---|---|---|---|---|---|---|---|---|---|---|---|---|---|---|---|---|
| Bits: 1 | 1 | 2 | 1 | 1 | [TBD] | [TBD] | [TBD] | [TBD] | [TBD] | [TBD] | [TBD] | [TBD] | [TBD] | [TBD] | [TBD] | [TBD] |
| 0: Controller 1: Controlee | 0: Normal 1: Secure | 00: Unicast 01: Multicast 10: Broadcast 11: Many-to-Many | 0: Contention Based 1: Scheduled | 0: SS-TWR 1: DS-TWR | XX ms (or us) | 00: Time (10us) 01: Length of Slot 10: Length of Session 11: Reserved | Time OR Value for Multiplying with Length of Slot OR Length of Session | #XX | XX ms (or us) | Applicable for CM=01 & MM=1, Address/ Group ID | #XX | 1 to N_RS | Applicable for CM=10, #XX | Channel Idex | Preamble Idex | XX ms (or us) |

| Control Info Value | MEANING |
|---|---|
| 0 | This frame indicates that the responding end does not require TX-to-RX round-trip time and ranging result |
| 1 | This frame indicates that the responding end requires TX-to-RX round-trip time |
| 2 | This frame indicates that the responding end requires ranging result at the end of exchange |

FIG. 28C

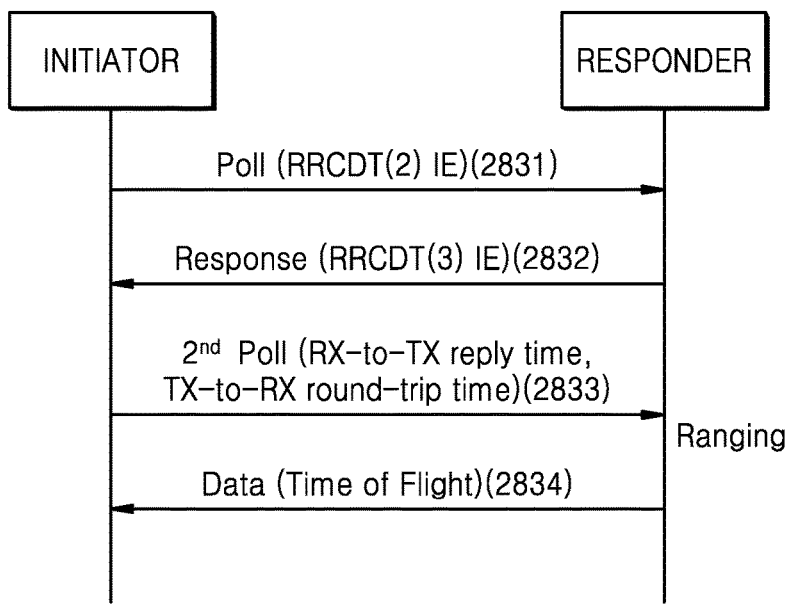

FIG. 29

| Control Info Value | MEANING |
|---|---|
| 0 | This frame is initiating DS-TWR and indicates that the initiating end does not require 1$^{st}$ reply time, 2$^{nd}$ TX-to-RX round-trip time and the ranging result |
| 1 | This frame is initiating DS-TWR and indicates that initiating end requires 1$^{st}$ reply time and 2$^{nd}$ TX-to-RX round-trip time at the end of exchange |
| 2 | This frame is initiating DS-TWR and indicates that initiating end requires ranging result at the end of exchange |
| 3 | This frame is continuing the DS-TWR and indicates the responding end requests for the 2nd TX-to-RX round-trip measurement |

FIG. 30A

| Octets : 4 | Octets : 0/6/8 |
|---|---|
| RX to TX Reply Time | MAC Address |

FIG. 30B

| Octets : 4 | Octets : 0/6/8 |
|---|---|
| TX to RX round trip time | MAC Address |

FIG. 30C

| Octets : 4 | Octets : 0/6/8 |
|---|---|
| Time of flight | MAC Address |

FIG. 31

| Octets : 4 | Octets : 0/6/8 |
|---|---|
| Tx-to-Rx round-trip time | MAC Address |

| Octets : 4 | Octets : 4 | Octets : 0/6/8 |
|---|---|---|
| Rx-to-Tx reply time | Tx-to-Rx round-trip time | MAC Address |

METHOD AND DEVICE FOR TRANSMITTING AND RECEIVING DATA VIA UWB IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0157482, filed on Dec. 7, 2018, in the Korean Intellectual Property Office, the disclosure of which is incorporated by reference herein in its entirety.

BACKGROUND

1. Field

The disclosure relates to a method and an electronic device for transmitting and receiving data via an ultra wideband (UWB) in a wireless communication system.

2. Description of the Related Art

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required. Thus, a sensor network, machine to machine (M2M) communication, machine type communication (MTC), and the like for connection between things have recently been studied. In IoT environments, an intelligent Internet Technology (IT) service for collecting and analyzing data generated by connected things and creating a new value in people's lives may be provided. IoT is applicable to various fields, such as smart home, smart building, smart city, smart car or connected car, smart grid, health care, smart home appliances, and advanced medical care, via convergence and combination of existing information technology (IT) with various industries.

Because mobile communication systems may provide various services due to the development of the above mobile communication systems, methods of effectively providing the services are required. There is also demand for a method of efficiently transmitting and receiving data among a plurality of electronic devices.

SUMMARY

Provided is a method and an electronic device for transmitting and receiving data via an ultra wideband (UWB) in a wireless communication system.

Additional aspects will be set forth in part in the description which follows and, in part, will be apparent from the description, or may be learned by practice of the presented embodiments.

In accordance with an aspect of the disclosure, an operation method of an electronic device for transmitting and receiving data through an ultra wideband (UWB) in a wireless communication system includes: transmitting, to another electronic device, a first ranging control message; transmitting, to the other electronic device, a ranging start message based on the first ranging control message; and receiving, from the other electronic device, a ranging response message based on the first ranging control message.

The first ranging control message may include first information used to determine a time interval from a time point when the first ranging control message is transmitted to a time point when a second ranging control message, different from the first ranging control message, is transmitted.

The first ranging control message may include: second information used to determine one of a slot length or a round length; and third information used to determine one of a multiple of the time interval, a multiple of the slot length, or a multiple of the round length.

The first ranging control message may include: fourth information used to determine one cast mode from among a unicast mode, a broadcast mode, a multicast-contention mode, or a multicast-scheduled mode; and fifth information used to determine one ranging operation mode from among a single-sided two-way ranging (SS-TWR) mode or a double-sided two-way (DS-TWR) mode.

The operation method may further include, when the cast mode determined via the fourth information is the broadcast mode and the ranging operation mode determined via the fifth information is the SS-TWR mode, receiving sixth information (RRTI IE) that is time interval information about a time interval from a time point when the other electronic device receives the ranging start message from the electronic device to a time point when the other electronic device transmits the ranging response message to the electronic device.

When the ranging operation mode determined via the fifth information is the SS-TWR mode, the ranging response message may include seventh information (RCST IE) used to determine whether the electronic device transmits at least one of: a TX-to-RX roundtrip time (RRTM) from the electronic device to the other electronic device; or a Ranging Result (RTOF).

When the ranging operation mode determined via the fifth information is the DS-TWR mode, the ranging response message may include eighth information (RDCT IE) used to determine whether the other electronic device transmits at least one of: time interval information (RRTI IE) about a time interval from a time point when the other electronic device receives the ranging start message from the electronic device to a time point when the other electronic device transmits the ranging response message to the electronic device; a TX-to-RX roundtrip time (RRTM IE) from the electronic device to the other electronic device; or a Ranging Result (RTOF IE).

The operation method may further include reporting, to the other electronic device, a roundtrip time from the electronic device to the other electronic device.

The operation method may further include receiving a report about a reception (RX)-to-transmission (TX) reply time of the other electronic device and a TX-to-RX roundtrip time of the electronic device from the other electronic device.

The first ranging control message may include ninth information used to determine that at least one of the electronic device or the other electronic device is to transmit the ranging start message.

In accordance with another aspect of the disclosure, an electronic device for transmitting and receiving data through an UWB in a wireless communication system includes: at least one transceiver; at least one memory storing a program; and at least one processor configured to execute the program to: transmit, to another electronic device via the transceiver, a first ranging control message; transmit, to the other electronic device via the transceiver, a ranging start message based on the first ranging control message; and receive, from the other electronic device via the transceiver, a ranging response message based on the first ranging control message.

The first ranging control message may include first information used to determine a time interval from a time point when the first ranging control message is transmitted to a time point when a second ranging control message, different from the first ranging control message, is transmitted.

The first ranging control message may include: second information used to determine one of a slot length or a round length; and third information used to determine one of a multiple of the time interval, a multiple of the slot length, or a multiple of the round length.

The first ranging control message may include: fourth information used to determine one cast mode from among a unicast mode, a broadcast mode, a multicast-contention mode, or a multicast-scheduled mode; and fifth information used to determine one ranging operation mode from among a single-sided two-way ranging (SS-TWR) mode or a double-sided two-way (DS-TWR) mode.

The processor may be further configured to execute the program to, when the cast mode determined via the fourth information is the broadcast mode and the ranging operation mode determined via the fifth information is the SS-TWR mode, receive via the transceiver sixth information (RRTI IE) that is time interval information about a time interval from a time point when the other electronic device receives the ranging start message from the electronic device to a time point when the other electronic device transmits the ranging response message to the electronic device.

When the ranging operation mode determined via the fifth information is the SS-TWR mode, the ranging response message may include seventh information (RCST IE) used to determine whether the electronic device transmits at least one of: a TX-to-RX roundtrip time (RRTM) from the electronic device to the other electronic device; or a Ranging Result (RTOF).

When the ranging operation mode determined via the fifth information is the DS-TWR mode, the ranging response message may include eighth information (RDCT IE) used to determine whether the other electronic device transmits at least one of: time interval information (RRTI IE) about a time interval from a time point when the other electronic device receives the ranging start message from the electronic device to a time point when the other electronic device transmits the ranging response message to the electronic device; a TX-to-RX roundtrip time (RRTM IE) from the electronic device to the other electronic device; or a Ranging Result (RTOF IE).

The at least one processor may be further configured to execute the program to report, to the other electronic device via the transceiver, a roundtrip time from the electronic device to the other electronic device.

The at least one processor may be further configured to execute the program to receive a report about a reception (RX)-to-transmission (TX) reply time of the other electronic device and a TX-to-RX roundtrip time of the electronic device from the other electronic device.

The first ranging control message may include ninth information used to determine that at least one of the electronic device or the other electronic device is to transmit the ranging start message.

In accordance with another aspect of the disclosure, a non-transitory computer-readable recording medium has recorded thereon instructions executable by at least one processor of an electronic device to cause the processor to perform an operation method for transmitting and receiving data through an ultra wideband (UWB) in a wireless communication system, the operation method includes: transmitting, to another electronic device, a first ranging control message; transmitting, to the other electronic device, a ranging start message based on the first ranging control message; and receiving, from the other electronic device, a ranging response message based on the first ranging control message.

The first ranging control message may include first information used to determine a time interval from a time point when the first ranging control message is transmitted to a time point when a second ranging control message, different from the first ranging control message, is transmitted.

The first ranging control message may include: second information used to determine one of a slot length or a round length; and third information used to determine one of a multiple of the time interval, a multiple of the slot length, or a multiple of the round length.

The first ranging control message may include: fourth information used to determine one cast mode from among a unicast mode, a broadcast mode, a multicast-contention mode, or a multicast-scheduled mode; and fifth information used to determine one ranging operation mode from among a single-sided two-way ranging (SS-TWR) mode or a double-sided two-way (DS-TWR) mode.

The operation method may further include, when the cast mode determined via the fourth information is the broadcast mode and the ranging operation mode determined via the fifth information is the SS-TWR mode, receiving sixth information (RRTI IE) that is time interval information about a time interval from a time point when the other electronic device receives the ranging start message from the electronic device to a time point when the other electronic device transmits the ranging response message to the electronic device.

When the ranging operation mode determined via the fifth information is the SS-TWR mode, the ranging response message may include seventh information (RCST IE) used to determine whether the electronic device transmits at least one of: a TX-to-RX roundtrip time (RRTM) from the electronic device to the other electronic device; or a Ranging Result (RTOF).

When the ranging operation mode determined via the fifth information is the DS-TWR mode, the ranging response message may include eighth information (RDCT IE) used to determine whether the other electronic device transmits at least one of: time interval information (RRTI IE) about a time interval from a time point when the other electronic device receives the ranging start message from the electronic device to a time point when the other electronic device transmits the ranging response message to the electronic device; a TX-to-RX roundtrip time (RRTM IE) from the electronic device to the other electronic device; or a Ranging Result (RTOF IE).

The operation method may further include reporting, to the other electronic device, a roundtrip time from the electronic device to the other electronic device.

The operation method may further include receiving a report about a reception (RX)-to-transmission (TX) reply time of the other electronic device and a TX-to-RX roundtrip time of the electronic device from the other electronic device.

The first ranging control message may include ninth information used to determine that at least one of the electronic device or the other electronic device is to transmit the ranging start message.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table showing a structure of payload information elements including an IE ID and IE content;

FIG. 6 is a table for explaining the types of a Ranging Control Double-sided TWR (RCDT) IE;

FIG. 15A schematically illustrates a structure of a Ranging Control IE (RC IE) according to an embodiment;

FIG. 15B schematically illustrates a structure of an RC IE according to an embodiment;

FIG. 20A is a diagram for explaining ranging control (RC) that is set in a Multicast-Scheduled SS-TWR operation according to an embodiment;

FIG. 20B is a diagram for explaining RC that is set in a Multicast-Scheduled SS-TWR operation according to an embodiment;

FIG. 21 is a diagram for explaining a Multicast-Scheduled SS-TWR operation according to an embodiment;

FIG. 22A is a diagram for explaining RC that is set in a Multicast-Scheduled DS-TWR operation according to an embodiment;

FIG. 22B is a diagram for explaining RC that is set in a Multicast-Scheduled DS-TWR operation according to an embodiment;

FIG. 24A is a diagram for explaining an embodiment in which a Pointer to next Ranging Control field includes a unit time field and a field of a multiple of a unit time;

FIG. 24B is a diagram for explaining, in detail, a content field format of an RC IE including an RI field and a Time Unit for RI field, according to an embodiment;

FIG. 28C is a diagram for explaining a ranging operation by both an initiator and a responder in DS-TWR, according to an embodiment;

FIG. 29 is a diagram for explaining a ranging operation by both an initiator and a responder in DS-TWR, according to an embodiment;

FIG. 30A is a table schematically illustrating modified information for multicast/broadcast ranging of a Ranging-related IE defined in the existing 802.15.8 standard;

FIG. 30B is a table schematically illustrating modified information for multicast/broadcast ranging of a Ranging-related IE defined in the existing 802.15.8 standard;

FIG. 30C is a table schematically illustrating modified information for multicast/broadcast ranging of a Ranging-related IE defined in the existing 802.15.8 standard;

FIG. 31 is a table schematically illustrating a content field format of an Ranging Time Report Single-sided TWR IE (RTRST IE), according to an embodiment;

DETAILED DESCRIPTION

Figure 1:
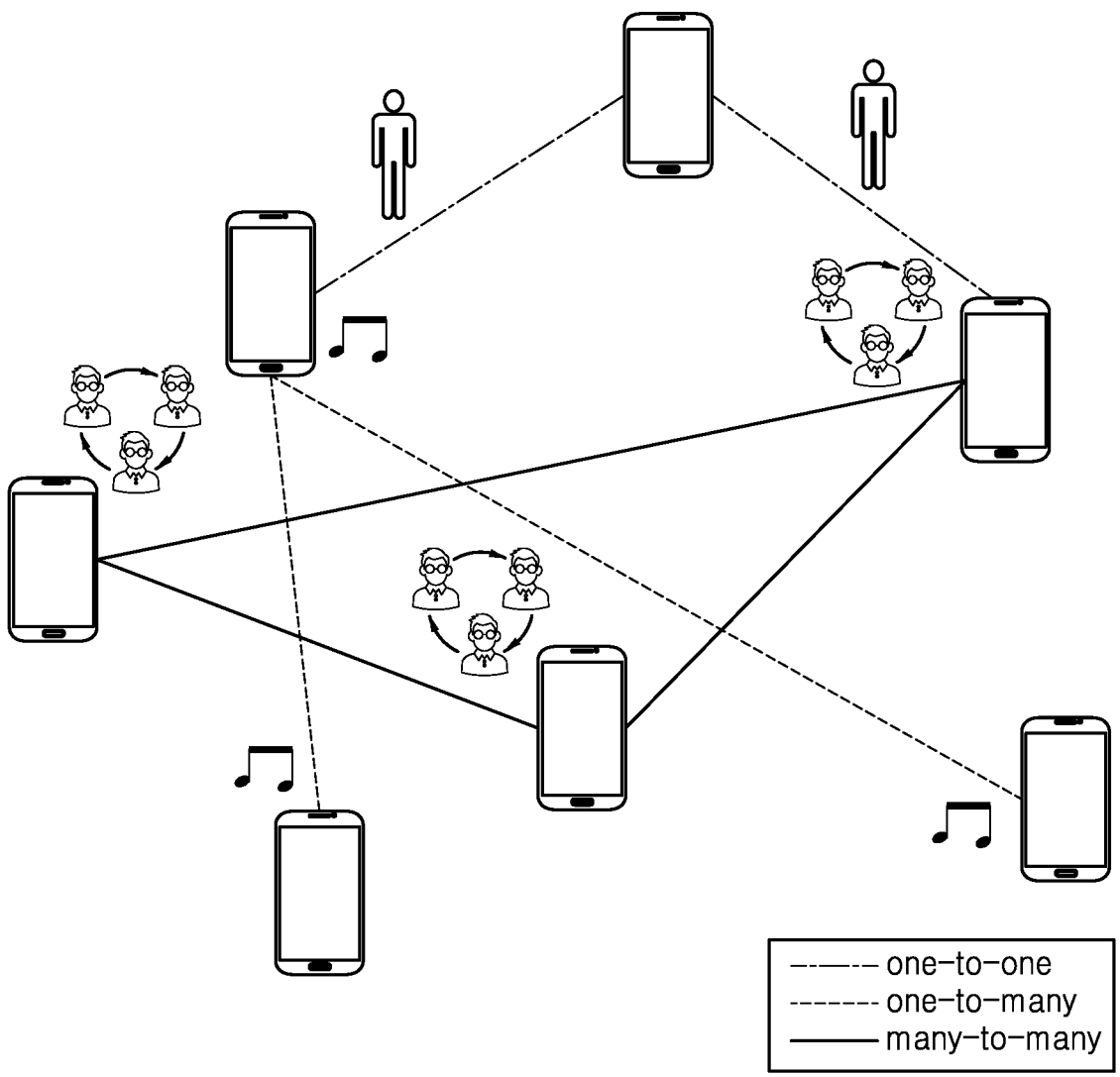
FIG. 1 is a diagram for describing a general Device-to-Device (D2D) communication procedure.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein. In the drawings, like numbers refer to like elements throughout.

Throughout the disclosure, expressions such as "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like. In the disclosure, a controller may also be referred to as a processor.

Throughout the specification, a layer (or a layer apparatus) may also be referred to as an entity.

Although general terms widely used at present were selected for describing the disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

While such terms as "first," "second," etc., may be used to describe various components, such components must not be limited to the above terms. The above terms are used only to distinguish one component from another.

The terms used in the present specification are merely used to describe particular embodiments, and are not intended to limit the scope of the disclosure. An expression used in the singular encompasses the expression of the plural, unless it has a clearly different meaning in the context. Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this disclosure, specify the presence of stated elements, but do not preclude the presence or addition of one or more other elements.

The use of the terms "a," "an," "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. Embodiments of the disclosure are not limited to the described order of the operations.

Thus, the expression "according to an embodiment" used in the entire disclosure does not necessarily indicate the same embodiment.

Embodiments of the present disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of techniques according to the related art for electronics configuration, signal processing and/or control, data processing and the like. The words "mechanism," "element," "means," and "configuration" are used broadly and are not limited to mechanical or physical embodiments of the disclosure.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

In general, a wireless sensor network technology is broadly classified into a wireless local area network (WLAN) and a wireless personal area network (WPAN) according to coverage. In this regard, the WLAN refers to a technology that is based on the Institute of Electrical and Electronics Engineers (IEEE) 802.11 and is capable of accessing a backbone network within a range of 100 m. Also, the WPAN refers to a technology that is based on the IEEE 802.15 and includes Bluetooth, ZigBee, ultra-wideband (UWB), or the like. A wireless sensor network in which the wireless sensor network technology is implemented includes a plurality of communication electronic devices. In this regard, the communication electronic devices perform communication in an ACTIVE period by using a single channel. In other words, the communication electronic devices collect a packet in real time, and transmit the collected packet in the ACTIVE period.

The UWB may refer to a short range high-speed wireless communication technology using a wide frequency band of at least several GHz, a low spectrum density, and a small pulse bandwidth (1 to 4 nsec) in a baseband state. The UWB may indicate a bandwidth itself to which UWB communication is applied. Hereinafter, a communication method performed by electronic devices will now be described based on the UWB, but this is only an example and the communication method may be applied to various wireless communication technologies in a practical use.

An electronic device according to embodiments may include a mobile phone, a smartphone, a mobile terminal, a laptop computer, a terminal for digital broadcasting, a personal digital assistant (PDA), a portable multimedia player (PMP), a navigation device, a slate personal computer (slate PC), a tablet PC, an ultrabook, a telematics terminal, a digital television (digital TV), a desktop computer, a refrigerator, a projector, a vehicle, a smart car, a printer, or the like.

The disclosure will now be described more fully with reference to the accompanying drawings, in which embodiments are shown.

FIG. 1 is a diagram for describing a general Device-to-Device (D2D) communication procedure.

D2D communication refers to direct communication between geographically adjacent electronic devices, without using infrastructure such as a base station. The D2D communication may use an unlicensed frequency band such as Wi-Fi Direct or Bluetooth. Also, the D2D communication may use a licensed frequency band, thereby improving frequency usage efficiency of a cellular system. The D2D communication may be limitedly used as a term that indicates communication between objects or machine to machine (M2M) communication, but in the disclosure, the D2D communication may totally include communication between not only simple devices embedded with a communication function but also communication between various types of devices such as smartphones or personal computers having a communication function.

Peer Aware Communication (PAC) is a communication scheme for a device and a service in a short range and is one of technologies of the D2D communication. In the PAC, a D2D electronic device may be called a Peer Aware Communication Device (PD).

As illustrated in FIG. 1, in the PAC, there may be a one-to-one communication scheme by which one PD communicates with another PD, a one-to-many communication scheme by which one PD communicates with a plurality of PDs, and a many-to-many communication scheme by which a plurality of PDs communicate with a plurality of PDs.

Figure 2:
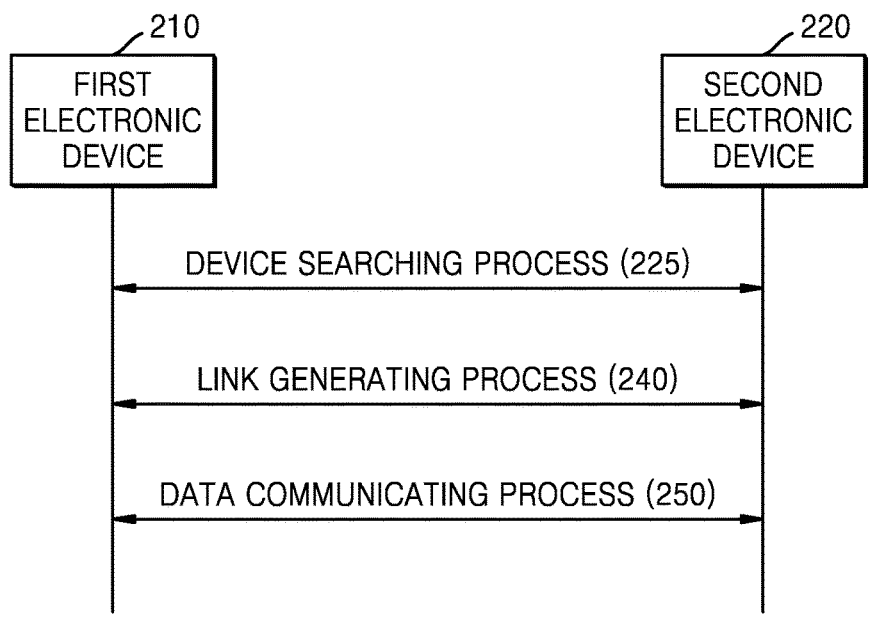
FIG. 2 illustrates communication processes by a plurality of electronic devices.

FIG. 2 illustrates a communication process by a plurality of electronic devices.

Referring to FIG. 2, a first electronic device 210 and a second electronic device 220 may mutually perform communication via a device searching process 225, a link generating process 240, and a data communicating process 250.

In the device searching process 225, each of the first electronic device 210 and the second electronic device 220 may search for other electronic devices that are capable of the D2D communication from among electronic devices around the first electronic device 210 and the second electronic device 220. In the device searching process 225, each of the first electronic device 210 and the second electronic device 220 may determine whether to generate a link for the D2D communication. For example, the first electronic device 210 may transmit a search signal to allow the second electronic device 220 to discover the first electronic device 210. Also, the first electronic device 210 may receive a search signal transmitted from the second electronic device 220 and thus may recognize that other electronic devices capable of the D2D communication are present in a D2D communication range.

In the link generating process 240, each of the first electronic device 210 and the second electronic device 220 may generate a data transmission link for an electronic device to which data is to be transmitted from among electronic devices discovered in the device searching process 225. For example, the first electronic device 210 may generate a data transmission link for the second electronic device 220 discovered by the first electronic device 210 in the device searching process 225.

In the data communicating process 250, the first electronic device 210 and the second electronic device 220 may transmit and receive data with respective devices for which links have been generated in the link generating process 240. For example, the first electronic device 210 may transmit and receive data with the second electronic device 220 via the data transmission link generated in the link generating process 240.

Figure 3:
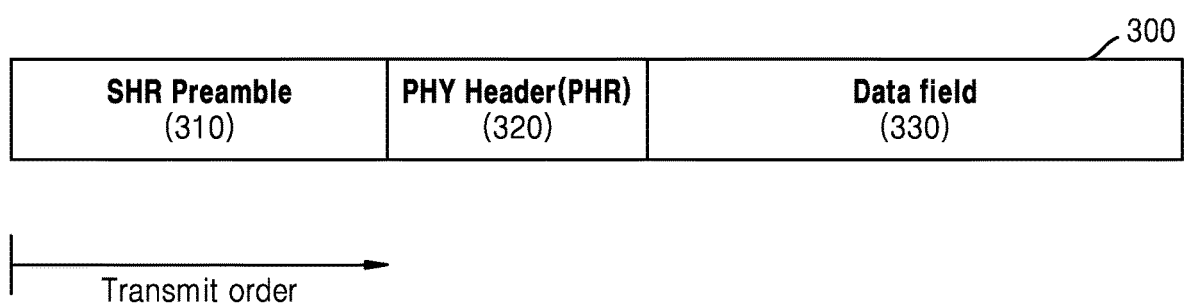
FIG. 3 illustrates a structure of an ultra wideband (UWB) PHY frame.

FIG. 3 illustrates a structure of a UWB PHY frame 300.

Referring to FIG. 3, the UWB PHY frame 300 may include a synchronization header (SHR) preamble 310, a PHY header (PHR) 320, and a data field 330.

The SHR preamble 310 may be used for at least one of an automatic gain control (AGC), signal acquisition, frequency offset estimation, packet synchronization, channel estimation, ranging, or the like. In detail, the SHR preamble 310 may be added, prior to the PHR 320, for a receiver algorithm related to AGC setting, antenna diversity selection, timing acquisition, a frequency recovery, packet and frame synchronization, channel estimation, and leading-edge signal tracking for ranging. The SHR preamble 310 may be referred to as a preamble code.

The PHR 320 may include contents of a PHY protocol data unit (PPDU) and information about a protocol used in transmitting the PPDU.

The data field 330 may include data that is transmitted and received.

In a wireless communication system, an SHR preamble may be transmitted as a head of a frame so as to obtain synchronization between a transmitter and a receiver. The SHR preamble may be a signal agreed between the transmitter and the receiver. In the wireless communication system, the SHR preamble may be determined to allow fast synchronization between the transmitter and the receiver via a start point of the frame.

Figure 4:
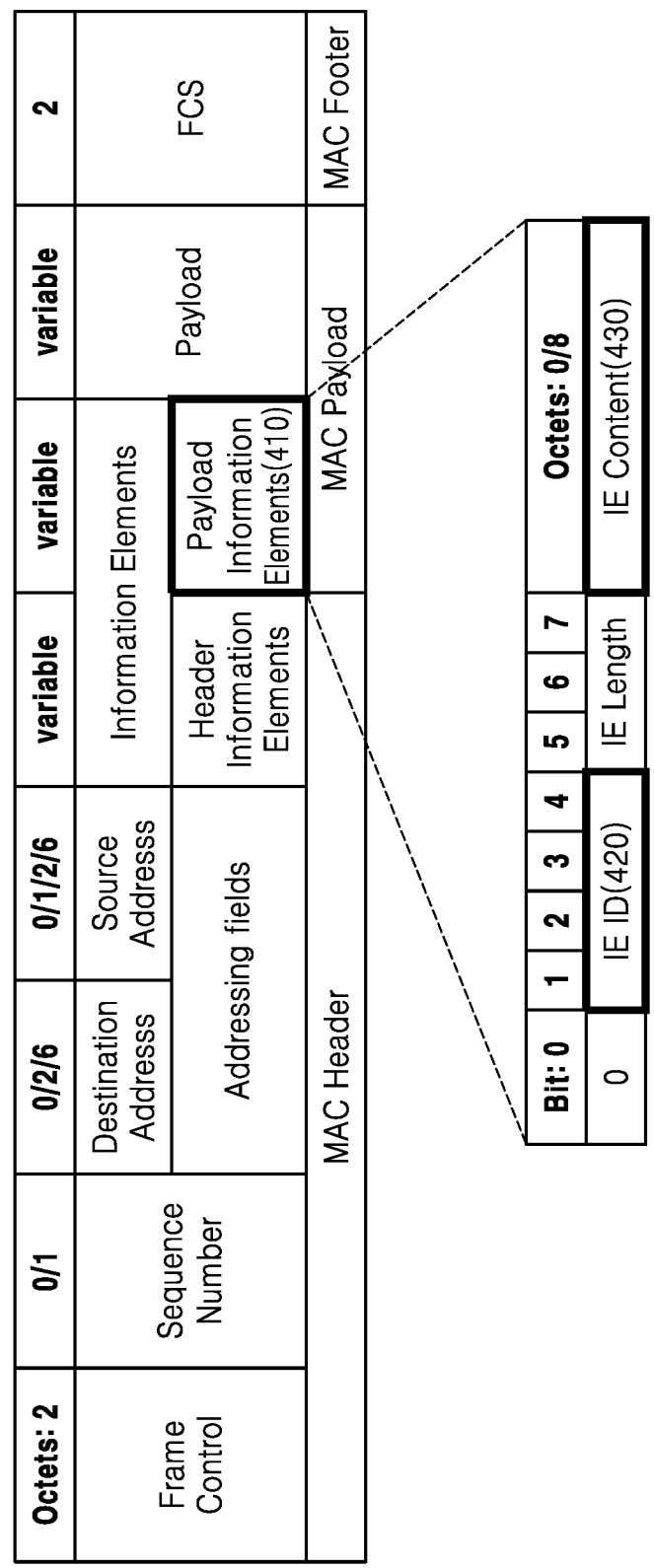
FIG. 4 is a diagram for explaining a structure of a payload information element (IE) of a UWB MAC frame.

FIG. 4 is a diagram for explaining a structure of a payload information element (IE) of a UWB MAC frame.

Referring to FIG. 4, the UWB MAC frame may include a media access control (MAC) header, a MAC payload, and a MAC footer.

The UWB MAC frame may include frame control, a sequence number, a destination address, a source address, addressing fields, information elements, header information elements, payload information elements 410, a payload, a frame check sequence (FCS).

The payload information elements 410 may refer to a data field that is used in a ranging operation for estimating a distance between a plurality of electronic devices. The payload information elements 410 may be referred to as a Class 0 payload IE.

The payload information elements 410 may include an information element ID (IE ID) 420, an IE length, and IE content 430.

The IE ID 420 may consist of a total of four bits from bit No. 1 to bit No. 4.

The IE content 430 may consist of 8 bytes (64 bits). In detail, when the length of content fields is 0-octet, the IE content 430 may not be included in the payload information element 410. When the length of content fields is 8-octet, the IE content 430 may be included in the payload information element 410 and may consist of 8 bytes (64 bits).

FIG. 5 is a table showing a structure of the payload information elements 410 including the IE ID 420 and the IE content 430.

Referring to FIG. 5, the payload information elements 410 may include a Ranging Request Reply Time (RRRT) IE 501, a Ranging Reply Time Instantaneous (RRTI) IE 502, a Ranging Reply Time Deferred (RRTD) IE 503, a Ranging Preferred Reply Time (RPRT) IE 504, a Ranging Control Double-sided Two-Way Ranging (TWR) (RCDT) IE 505, a Ranging Round Trip Measurement (RRTM) IE 506, a Ranging Time-of-Flight (RTOF) IE 507, and an Interaction Time Adjustment (ITA) IE 508.

The RRRT IE 501 may be used to request an electronic device performing a ranging operation for a ranging reply time.

The RRTI IE 502 may be used to previously determine a transmission time period of a frame including an IE.

The RRTD IE 503 may be used for a TWR exchange to be completed. The RRTD IE 503 may also be used when an electronic device is unable to determine a reply time until a reply is transmitted.

The RPRT IE 504 may refer to the capability of an electronic device to transmit a ranging reply.

The RCDT IE 505 may be used to control the TWR exchange.

The RRTM IE 506 may refer to a difference between a frame transmission time when a round trip measurement has started and a frame reception time when the round trip measurement has been completed.

The RTOF IE 507 may refer to a time-of-flight between the transmitter and the receiver.

The ITA IE 508 may be used to adjust a frame transmission time period for interaction with an electronic device.

FIG. 6 is a table for explaining the types of the RCDT IE 505.

A control information value 600 may be included in the IE content 430 and then transmitted.

When the control information value 600 is 0 (610), a frame including RCDT(0) IE may initiate DS-TWR and indicate that the transmitter does not require a ranging result. in other words, this frame is initiating DS-TWR and indicates that the initiating end does not require the ranging result.

When the control information value 600 is 1 (611), a frame including RCDT(1) IE may initiate DS-TWR and request that the ranging result is transmitted back when exchange ends. In other words, this frame is initiating DS-TWR and requesting that the ranging result is sent back at end of exchange.

When the control information value 600 is 2 (612), a frame including RCDT(2) IE may form a request for a second TX-to-RX roundtrip measurement while continuing the DS-TWR. in other words, this frame is continuing the DS-TWR, forming the request for the 2nd TX-to-RX roundtrip measurement.

Figure 7:
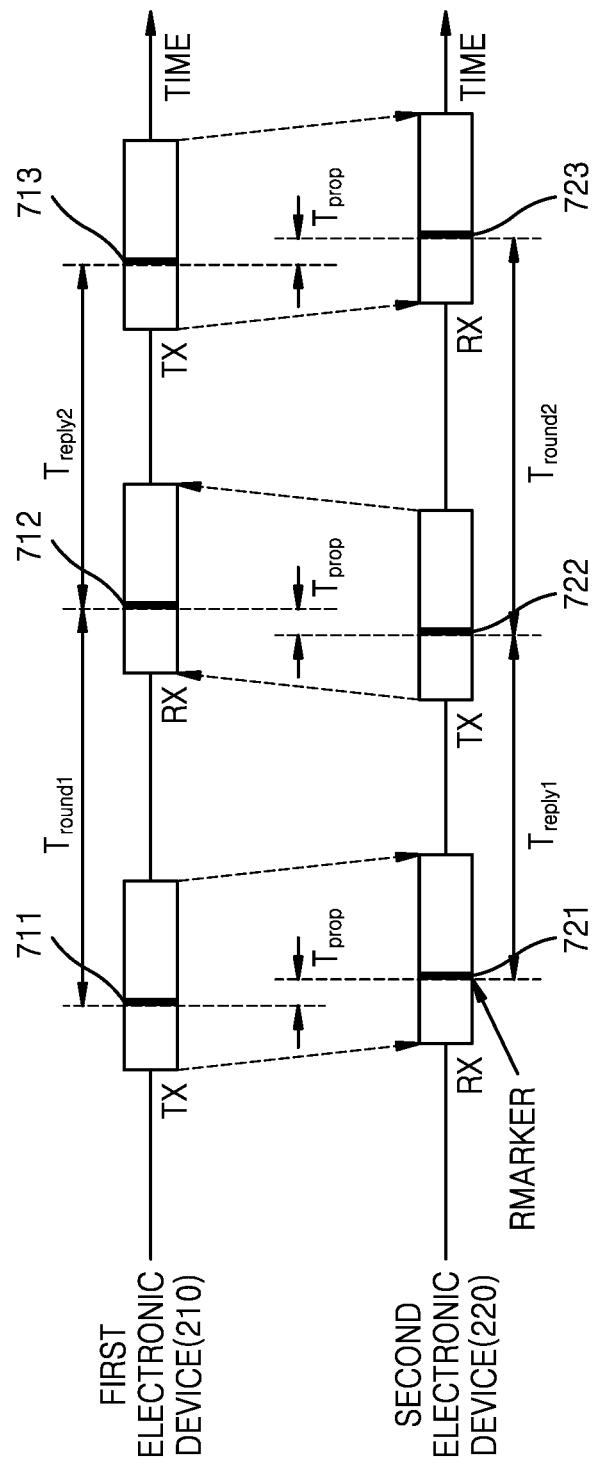
FIG. 7 is a schematic diagram for describing Double-sided Two-Way Ranging (DS-TWR) operations of electronic devices.

FIG. 7 is a schematic diagram for describing a Double-Sided TWR (DS-TWR) operation performed by electronic devices.

Referring to FIG. 7, RMARKER may refer to information in a frame so as to define a reference time point. An electronic device may measure a time interval based on RMARKER.

The first electronic device 210 may measure, as $T_{round1}$, a time between 1-1 RMARKER 711 and 1-2 RMARKER 712, the 1-1 RMARKER 711 included in a frame transmitted (TX) to the second electronic device 220 and the 1-2 RMARKER 712 included in a frame received (RX) from the second electronic device 220.

The second electronic device 220 may measure, as $T_{reply1}$, a time between 2-1 RMARKER 721 and 2-2 RMARKER 722, the 2-1 RMARKER 721 included in a frame received (RX) from the first electronic device 210 and the 2-2 RMARKER 722 included in a frame transmitted (TX) to the first electronic device 210.

The first electronic device 210 may measure, as $T_{reply2}$, a time between 1-2 RMARKER 712 and 1-3 RMARKER 713, the 1-2 RMARKER 721 included in a frame received (RX) from the second electronic device 220 and the 1-3 RMARKER 713 included in a frame transmitted (TX) to the first electronic device 210.

The first electronic device 210 may measure, as $T_{round2}$, a time between 2-2 RMARKER 722 and 2-3 RMARKER 723, the 2-2 RMARKER 722 included in a frame transmitted (TX) to the second electronic device 220 and the 2-3 RMARKER 723 included in a frame received (RX) from the second electronic device 220.

Time-of-Flight (ToF) time $T_{prop}$ may be calculated according to Equation 1 below.

$$\hat{T}_{prop} = \frac{(T_{round1} \times T_{round2} - T_{reply1} \times T_{reply2})}{(T_{round1} + T_{round2} + T_{reply1} + T_{reply2})} \quad \text{[Equation 1]}$$

Figure 8:
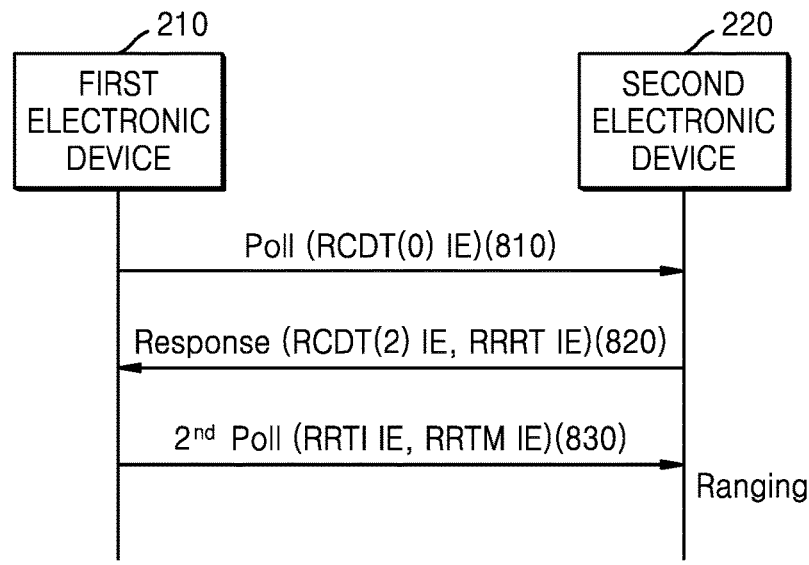
FIG. 8 is a schematic diagram for explaining DS-TWR operations of electronic devices.

FIG. 8 is a schematic diagram for explaining a DS-TWR operation performed by electronic devices.

Referring to FIG. 8, in operation 810, the first electronic device 210 may start a ranging operation (Ranging poll) by transmitting a data frame including RCDT(0) IE to the second electronic device 220.

In operation 820, the second electronic device 220 may transmit (Ranging response) a data frame including RCDT(2) IE and RRRT IE to the first electronic device 210. In this regard, the second electronic device 220 may measure $T_{reply1}$. As described above, $T_{reply1}$ may indicate a time between RMARKER included in a data frame received (RX) by the second electronic device 220 from the first electronic device 210 and RMARKER included in a data frame transmitted (TX) by the second electronic device 220 to the first electronic device 210. Hereinafter, measurement principles related to time intervals described with reference to FIG. 7 are equally applied to $T_{reply2}$, $T_{round1}$, and $T_{round2}$.

In operation 830, the first electronic device 210 may transmit ($2^{nd}$ Poll), to the second electronic device 220, a data frame including RRTI IE ($T_{reply2}$) and RRTM IE ($T_{round1}$) that are each timestamp information.

The second electronic device 220 may measure a value of $T_{round2}$, and may calculate the ToF time $T_{prop}$ according to Equation 1 described above.

An estimated distance (Ranging) between two electronic devices may be calculated by multiplying $T_{prop}$ by speed of light ($3*10^8$ m/s).

Figure 9:
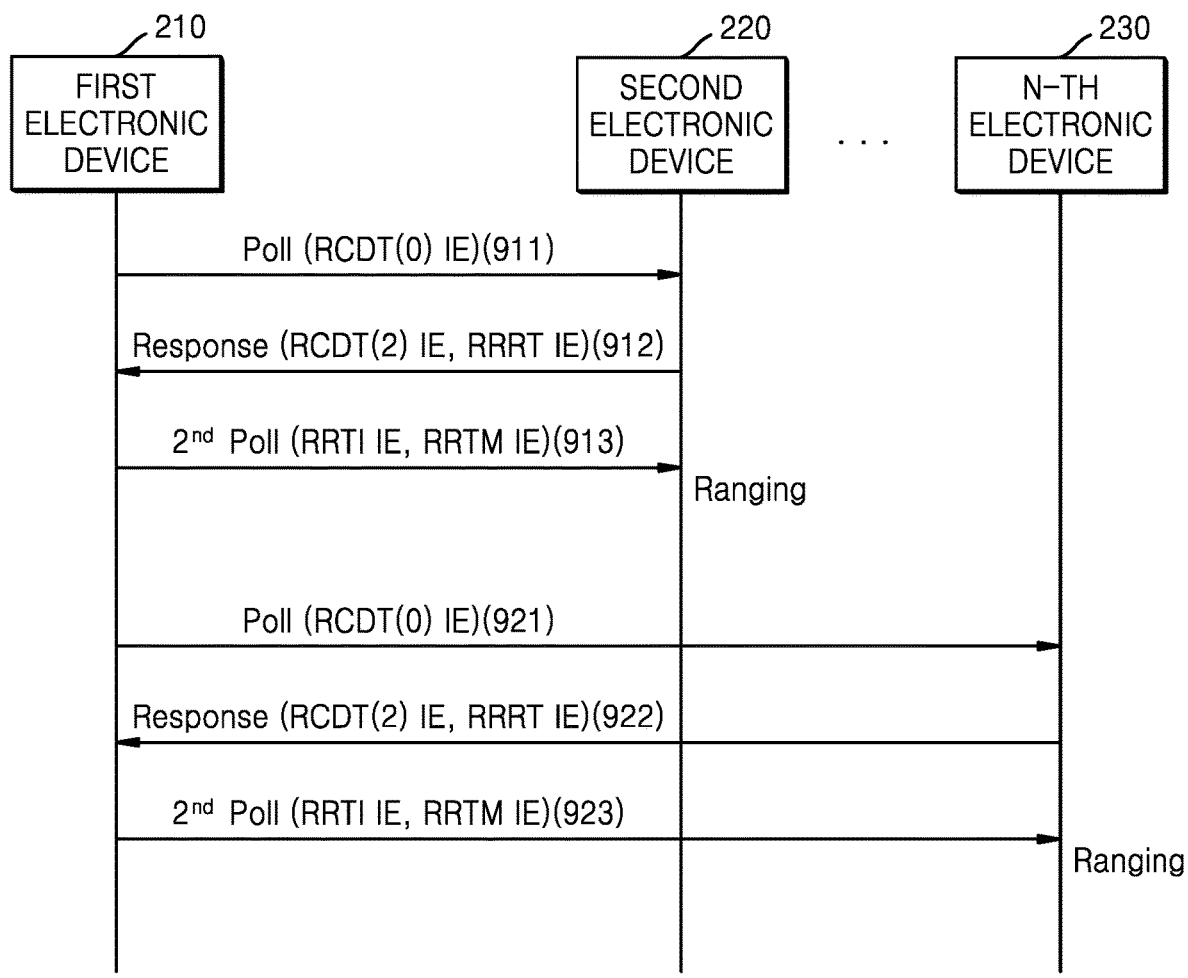
FIG. 9 is a diagram illustrating a message transmission process when there are a plurality of target electronic devices seeking to calculate a Time of Flight (ToF), in a DS-TWR operation performed by electronic devices.

FIG. 9 is a diagram illustrating a message transmission process when there are a plurality of target electronic devices seeking to calculate a ToF, in a DS-TWR operation by electronic devices.

To perform a ToF calculation on each of the second electronic device 220 and the N-th electronic device 230, the first electronic device 210 may transmit a ranging message to each of the second electronic device 220 and the N-th electronic device 230, where N is a natural number greater than or equal to 3.

In detail, the first electronic device 210 may start a ranging operation (Ranging poll) by transmitting a data frame including RCDT(0) IE to each of the second electronic device 220 and the N-th electronic device 230.

Each of the second electronic device 220 and the N-th electronic device 230 may transmit (Ranging response) a data frame including an RCDT(2) IE and an RRRT IE to the first electronic device 210. At this time, each of the second electronic device 220 and the N-th electronic device 230 may measure $T_{reply1}$.

The first electronic device 210 may transmit ($2^{nd}$ Poll) a data frame including an RRTI IE ($T_{reply2}$) and an RRTM IE ($T_{round1}$), which are each timestamp information, to each of the second electronic device 220 and the N-th electronic device 230.

At this time, the first electronic device 210, which is an electronic device that starts ranging, may transmit a Ranging $2^{nd}$ Poll message including timestamp measurement values ($T_{reply2}$ and $T_{round1}$) and a Ranging poll message to each of the second electronic device 220 and the N-th electronic device 230.

Figure 10:
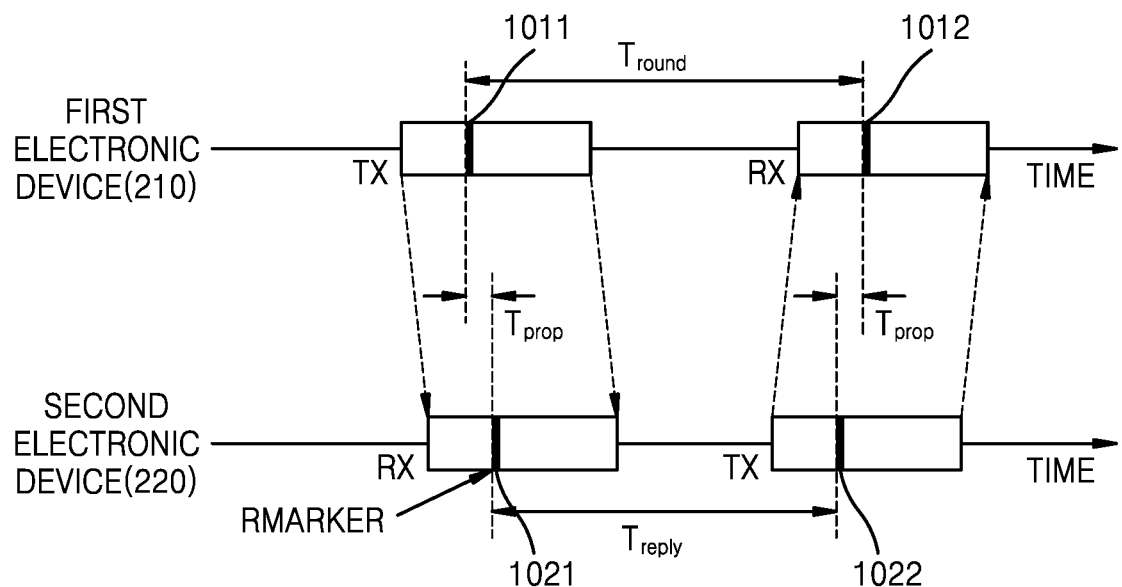
FIG. 10 is a schematic diagram for describing a single-sided two-way ranging (SS-TWR) operation performed by electronic devices.

FIG. 10 is a schematic diagram for describing a single-sided two-way ranging (SS-TWR) operation by electronic devices.

Referring to FIG. 10, RMARKER may refer to data in a frame so as to define a reference time point. An electronic device may measure a time interval based on RMARKER.

The first electronic device 210 may measure, as $T_{round}$, a time between 1-1 RMARKER 1011 and 1-2 RMARKER 1012, the 1-1 RMARKER 1011 included in a frame transmitted (TX) to the second electronic device 220 and the 1-2 RMARKER 1012 included in a frame received (RX) from the second electronic device 220.

The second electronic device 220 may measure, as $T_{reply}$, a time between 2-1 RMARKER 1021 and 2-2 RMARKER 1022, the 2-1 RMARKER 1021 included in a frame received (RX) from the first electronic device 210 and the 2-2 RMARKER 1022 included in a frame transmitted (TX) to the first electronic device 210.

Time-of-Flight (ToF) time $T_{prop}$ may be calculated according to Equation 2 below.

$$\hat{T}_{prop} = \frac{1}{2}(T_{round} - T_{reply})$$ [Equation 2]

Figure 11:
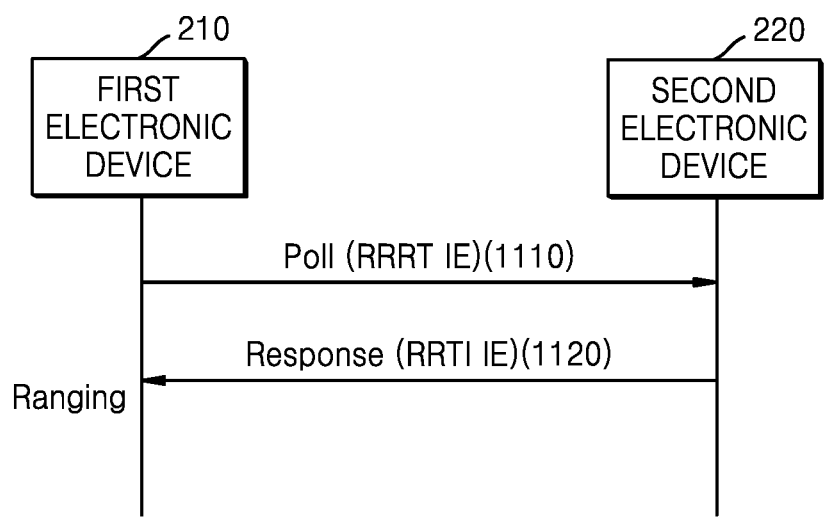
FIG. 11 is a schematic diagram for describing an SS-TWR operation performed by electronic devices.

FIG. 11 is a schematic diagram for describing an SS-TWR operation by electronic devices.

Referring to FIG. 11, in operation 1110, the first electronic device 210 may start a ranging operation (Ranging poll) by transmitting a data frame including an RRRT IE to the second electronic device 220.

In operation 1120, the second electronic device 220 may transmit, to the first electronic device 210, a data frame including an RRTI IE including timestamp information ($T_{reply}$).

The first electronic device 210 may receive the data frame including the RRTI IE from the second electronic device 220 and may measure $T_{round}$.

ToF time $T_{prop}$ may be calculated according to above-described Equation 2. An estimated distance (Ranging) between two electronic devices may be calculated by multiplying $T_{prop}$ by speed of light ($3*10^8$ m/s).

Figure 12:
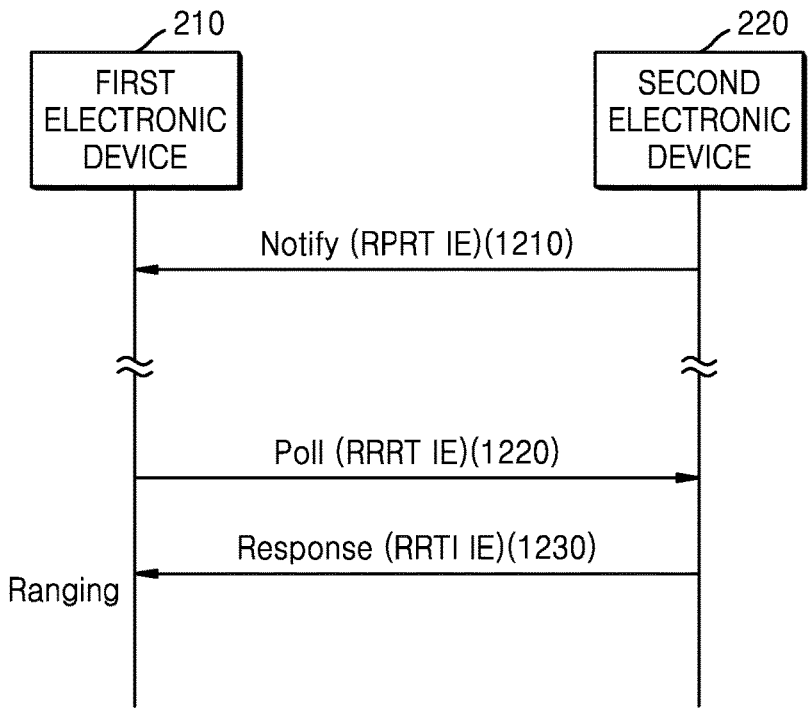
FIG. 12 is a schematic diagram for explaining an operation, performed by an electronic device receiving a Ranging Poll message, of previously notifying another electronic device of a time period during which a Ranging Reply Time Instantaneous (RRTI) IE is transmitted.

FIG. 12 is a schematic diagram for explaining an operation, performed by an electronic device receiving a Ranging Poll message, of previously notifying another electronic device of a time period during which the RRTI IE is transmitted.

Referring to FIG. 12, in operation 1210, the second electronic device 220 may transmit, to the first electronic device 210, an RPRT IE that is information about the time period during which the RRTI IE is transmitted. Accordingly, the first electronic device 210 and the second electronic device 220 may reduce power consumption by changing a current mode to a sleep mode until before the time period during which the RRTI IE is transmitted.

In operation 1220, the first electronic device 210 may start a ranging operation (Ranging poll) by transmitting a data frame including an RRRT IE to the second electronic device 220.

In operation 1230, the second electronic device 220 may transmit, to the first electronic device 210, a data frame including an RRTI IE including timestamp information ($T_{reply}$).

The first electronic device 210 may receive the data frame including the RRTI IE from the second electronic device 220 and may measure $T_{round}$.

ToF time $T_{prop}$ may be calculated according to above-described Equation 2. An estimated distance (Ranging) between two electronic devices may be calculated by multiplying $T_{prop}$ by speed of light ($3*10^8$ m/s).

Figure 13:
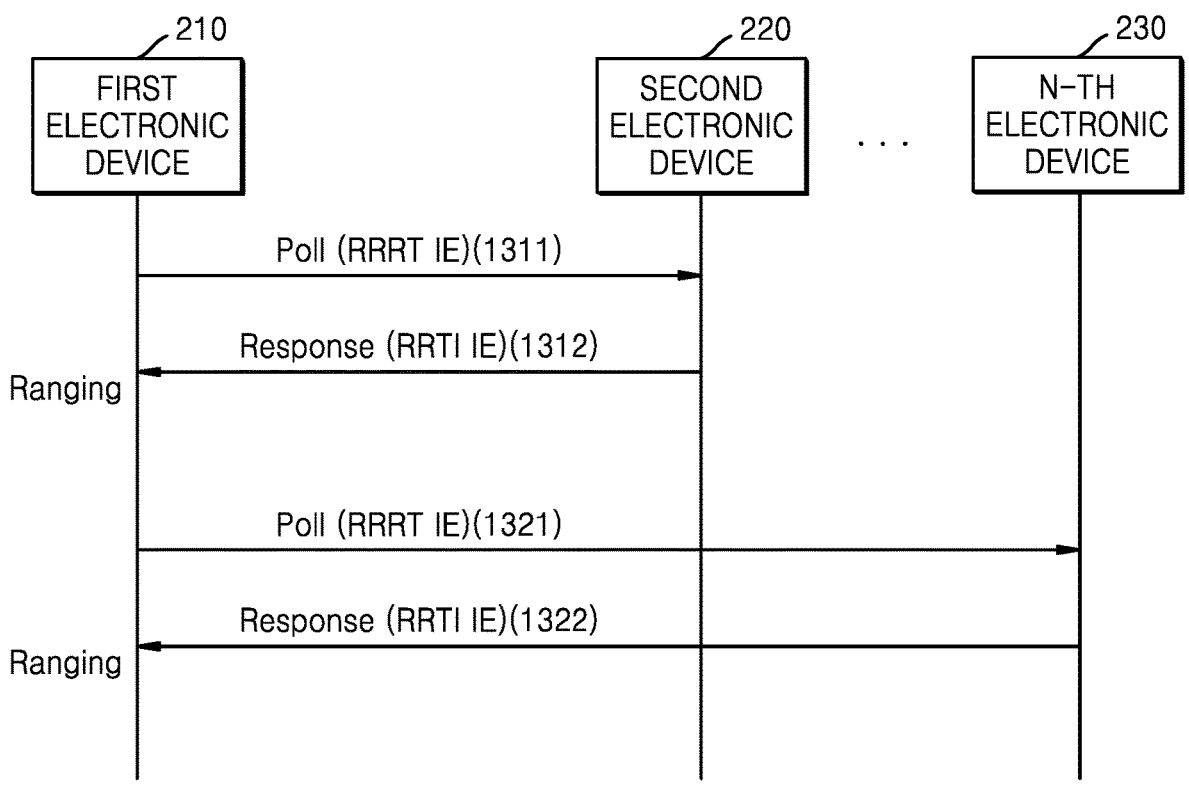
FIG. 13 is a diagram illustrating a message transmission process when there are a plurality of target electronic devices seeking to calculate a ToF, in an SS-TWR operation performed by electronic devices.

FIG. 13 is a diagram illustrating a message transmission process when there are a plurality of target electronic devices seeking to calculate a ToF, in an SS-TWR operation by electronic devices.

Referring to FIG. 13, to perform a ToF calculation on each of the second electronic device 220 and the N-th electronic device 230, the first electronic device 210 may transmit a ranging message to each of the second electronic device 220 (operation 1311) and the N-th electronic device 230 (operation 1322), where N is a natural number equal to greater than 3.

In detail, the first electronic device 210 may start a ranging operation (Ranging poll) by transmitting a data frame including an RRRT IE to each of the second electronic device 220 and the N-th electronic device 230.

Each of the second electronic device 220 and the N-th electronic device 230 may transmit (Ranging response) a data frame including an RRTI IE to the first electronic device 210 (operations 1312 and 1322).

In this case, a Ranging poll message that the first electronic device 210, which starts ranging, transmits may be transmitted to each of the second electronic device 220 and the N-th electronic device 230.

Figure 14:
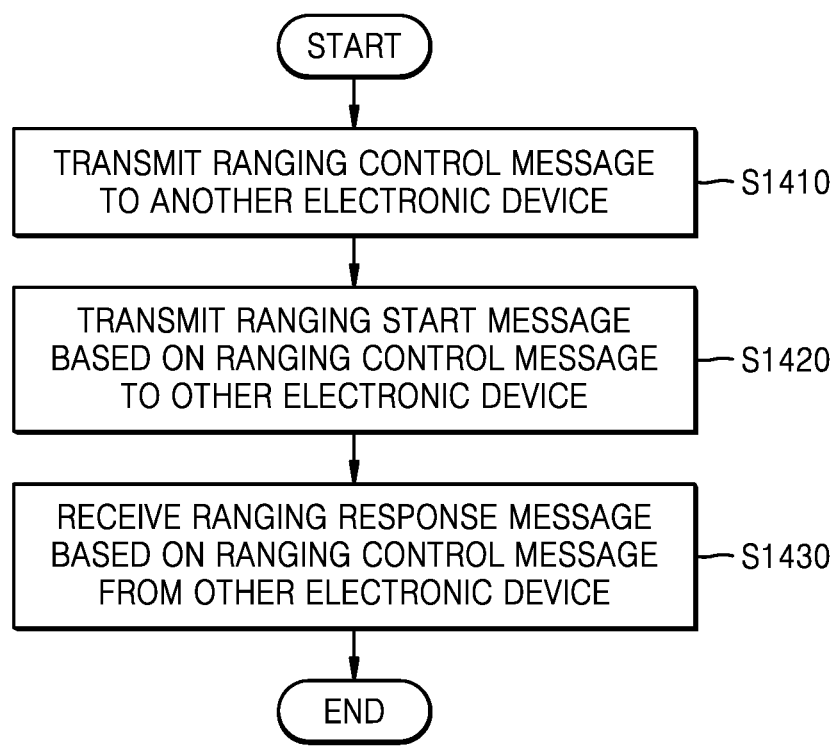
FIG. 14 is a flowchart of an operation method of an electronic device, according to an embodiment.

FIG. 14 is a flowchart of an operation method of an electronic device according to an embodiment.

Referring to FIG. 14, in operation S1410, the electronic device may transmit a ranging control message to another electronic device.

In operation S1420, the electronic device may transmit a ranging start message based on the ranging control message to the other electronic device.

In operation S1430, the electronic device may receive a ranging response message based on the ranging control message from the other electronic device.

The ranging control message may include first information used to determine a time interval from a time point when the ranging control message is transmitted to a time point when another ranging control message different from the former ranging control message is transmitted.

The ranging control message may include: second information used to determine one of the time interval from a time point when the ranging control message is transmitted to a time point when the other ranging control message different from the former ranging control message is transmitted, a slot length, or a round length; and third information used to determine one of a multiple of the time interval, a multiple of the slot length, or a multiple of the round length.

The ranging control message may include: fourth information used to determine one cast mode from among unicast, broadcast, multicast-contention, and multicast-scheduled; and fifth information used to determine one ranging operation mode from among an SS-TWR mode and a DS-TWR mode.

The operation method of the electronic device may further include receiving sixth information (RRTI IE) that is time interval information about a time interval from a time point when the other electronic device receives the ranging start message from the electronic device to a time point when the other electronic device transmits the ranging response message to the electronic device, when the cast mode determined via the fourth information is broadcast and the ranging operation mode determined via the fifth information is an SS-TWR mode.

When the ranging operation mode determined via the fifth information is an SS-TWR mode, the ranging response message may include seventh information (RCST IE) used to determine whether the electronic device transmits at least one of a TX-to-RX roundtrip time (RRTM) from the electronic device to the other electronic device or a Ranging Result (RTOF).

When the ranging operation mode determined via the fifth information is a DS-TWR mode, the ranging response message may include eighth information (RCDT IE) used to determine whether the other electronic device transmits at least one of the time interval information (RRTI IE) about the time interval from the time point when the other electronic device receives the ranging start message from the electronic device to the time point when the other electronic device transmits the ranging response message to the electronic device, the TX-to-RX roundtrip time (RRTM IE) from the electronic device to the other electronic device, or the Ranging Result (RTOF IE).

The operation method of the electronic device may further include reporting, to the other electronic device, the TX-to-RX roundtrip time from the electronic device to the other electronic device.

The operation method of the electronic device may further include: being reported, from the other electronic device, a roundtrip time from the electronic device to the other electronic device; and being reported, from the other electronic device, a roundtrip time from the other electronic device to the electronic device.

The ranging control message may include ninth information used to determine a subject to transmit the ranging start message as at least one of the electronic device or the other electronic device.

FIG. 15A schematically illustrates a structure of a Ranging Control IE (RC IE) according to an embodiment.

Referring to FIG. 15A, an electronic device for ranging control may transmit an RC IE to another electronic device. The electronic device for ranging control may share pieces of information necessary for performing a ranging operation, with the other electronic device, by transmitting the RC IE before transmitting a first poll message to the other electronic device.

Although the size of each field of the RC IE of FIG. 15A is illustrated as a particular number of bits, this is merely an example, and embodiments are not limited thereto.

A Poll Mode 1501 is a field that determines whether a subject to transmit a Poll message in a ranging operation is an electronic device having transmitted an RC IE (Poll Mode: 0) or an electronic device having received an RC IE (Poll Mode: 1). The electronic device having transmitted an RC IE may be referred to as a controller, and the electronic device having received an RC IE may be referred to as a controlee. A detailed description thereof is provided below with reference to FIG. 16.

A Secure Mode 1502 is a field that determines whether a ranging operation by electronic devices is a normal ranging mode (Secure Mode: 0) or a secure ranging mode (Secure Mode: 1). The normal ranging mode refers to a general ranging operation by electronic devices, which is described in the disclosure. In the secure ranging mode, a ranging operation is performed via a scrambled timestamp sequence (STS). The STS may be generated for every packet in a secure ranging session, via STS Data Init that is an initial value necessary for performing STS-based secure ranging. In an illustration where an STS is generated, a 256 bit session key between two electronic devices to perform a secure ranging operation may be input as an input value of a deterministic random bit generator (DRBG) and may be divided into a 128 bit key and a 128 bit data block. An AES128 encryption process may be performed via two input values, namely, the 128 bit key and the 128 bit data block. In the AES128 encryption process, 128 bit data may be transformed again into block data that is referred to as sixteen 8 bit In. Thereafter, based on 128 bit key information, a 128 bit cipher may be finally generated via a block encryption operation. For example, a data[31:0] value may be updated to data[31:0]=(data[31:0]+0x00000001) & 0xFFFFFFFF. The 128 bit cipher may be concatenated to the STS via a process of STS=STS II cipher[127:0]. Through the above-described process, a 128*N bit STS may be finally generated. Accordingly, N different bits, namely, 128 bits, constituting the final 128N bit STS may be generated. However, specific numbers in the above descriptions are merely an example for convenience of explanation.

A Cast Mode 1503 is a field that determines one cast mode from among a unicast mode (Cast Mode: 00), a broadcast mode (Cast Mode: 01), a multicast-contention mode (Cast Mode: 10), and a multicast-scheduled mode (Cast Mode: 11). When Cast mode=00, there are one electronic device (initiator) that transmits a Poll message and one electronic device (responder) that receives a Poll message; this case is therefore defined as unicast. When Cast mode=01, there are a plurality of electronic devices (responders) that receive a Poll message and an electronic device (initiator) that transmits a Poll message does not know the number of electronic devices (responders) receiving a Poll message or ID/MAC address information of the electronic devices (responders); this case is therefore defined as broadcast. When Cast mode=10 or 11, there are a plurality of electronic devices (responders) that receive a Poll message and an electronic device (initiator) that transmits a Poll message is aware of the number of electronic devices (responders) receiving the Poll message or the ID/MAC address information of the electronic devices (responders); this case is therefore defined as multicast. The multicast and the broadcast are described below with reference to FIGS. 17A and 17B.

A Ranging Mode 1504 is a field that determines one of an SS-TWR ranging mode (Ranging Mode: 0) or a DS-TWR ranging mode (Ranging Mode: 1).

A Pointer to next RC 1505 is a field that determines a time interval until a next RC IE is transmitted. The Pointer to next RC 1505 is described below with reference to FIG. 18.

A Number of Slots 1506 is a field that determines the number of slots or virtual slots. A virtual slot may refer to a slot used when, in a multicast/broadcast ranging operation, an electronic device (responder) receiving a Poll message transmits a response message to an electronic device (initiator) transmitting a Poll message. A description will now be given based on a virtual slot.

A Length of Slot 1507 is a field that determines a length of a virtual slot.

A Slot Allocation 1508 is a field for allocation information about the virtual slot. The Slot Allocation 1508 may be used when Cast Mode=11 (Multicast-Scheduled). The Slot Allocation 1508 may include information about an ID or a MAC address of a responder that is allocated for each virtual slot.

A Channel Number 1509 is a field including information about a number of a channel via which data is transmitted and received.

A Preamble Code Index 1510 indicates a preamble code that is to be used in a UWB by a plurality of electronic devices. Different preamble codes may be distinguished from one another via the Preamble Code Index 1510. A preamble code may be referred to as a synchronization header (SHR) preamble. The SHR preamble may be used in an automatic gain control (AGC), signal acquisition, frequency offset estimation, packet synchronization, channel estimation, ranging, or the like. In detail, the SHR preamble may be added, prior to a PHR, for a receiver algorithm related to AGC setting, antenna diversity selection, timing acquisition, a frequency recovery, packet and frame synchronization, channel estimation, and leading-edge signal tracking for ranging. The SHR preamble may be referred to as a preamble code.

A Period between Rounds 1511 is a field that is used when a ranging operation is periodically performed. When the Period between Rounds 1511 is used, the Pointer to next RC 1505 may not be used. The Period between Rounds 1511 is described below with reference to FIG. 19.

FIG. 15B schematically illustrates a structure of an RC IE according to an embodiment.

The respective definitions of the fields described above with reference to FIG. 15A are applicable to the fields of FIG. 15B. A session mentioned in FIG. 15B is described below with reference to FIGS. 17A and 17B.

Referring to FIG. 15B, a first field (1 bit) refers to a Poll Mode (PM). In the PM, a session that is performed after a frame (RCF) transmitting an RC IE determines whether a subject that transmits a poll message is a controller (PM=0) or a controlee (PM=1). An electronic device having transmitted an RC IE may be referred to as a controller, and an electronic device having received an RC IE may be referred to as a controlee. The RCF is described below with reference to FIGS. 17A and 17B.

A second field (1 bit) is a Secure Mode (SM), and determines whether the session that is performed after the RCF is normal ranging (SM=0) or secure ranging (SM=1) in which an STS is used.

A third field (2 bit) is a Cast Mode (CM), and corresponds to contents about which cast method the session that is performed after the RCF considers. When Cast mode (CM)=00, one initiator and one responder exist; this case is therefore defined as unicast. When Cast mode (CM)=01, several responders exist and an initiator is aware of the number of responders or ID/MAC address information of the responders; this case is therefore defined as multicast. When Cast mode (CM)=10, several responders exist and an initiator is not aware of the number of responders or the ID/MAC address information of the responders; this case is therefore defined as broadcast. When Cast mode (CM)=11, this case is defined as a state where several initiators and several responders exist.

A fourth field (1 bit) is a Multicast Mode (MM), and corresponds to contents about which multicast method is considered when the session that is performed after the RCF is a multicast method (CM=01). A virtual slot enables each responder to respond to a poll message transmitted by an initiator is considered. When MM=0, a multicast-contention method is considered, and this case is a situation where no virtual slots are allocated to each responder, and thus a response message is transmitted within a slot according to a contention method. When MM=1, a multicast-scheduled method is considered, and this case is a situation where a virtual slot is allocated to each responder, and thus a response message is transmitted within a slot according to a non-contention method. For reference, when CM=00, a unicast method is considered, and thus a non-contention method is considered. Further, when CM=10, a broadcast method is considered, and thus a contention method is considered. When CM=11, the many-to-many communication scheme described above with reference to FIG. 1 is considered, and thus a contention method or a non-contention method may be selected according to the multicast mode.

A fifth field (1 bit) is a Ranging Mode (RM), and determines whether the session that is performed after the RCF considers SS-TWR (Ranging mode (RM)=0) or DS-TWR (Raging mode (RM)=1).

A sixth field is a Ranging Interval (RI) field, and determines a time interval until a next RCF is transmitted. When a ranging procedure of a ranging session after an electronic device transmits an RCF is completely terminated, a transmitter/receiver is changed to a sleep mode until a next RCF starts, and is changed to an active mode after the lapse of the corresponding time interval.

An eleventh field and an eighth field are a Number of Slots (S_P_RS) and a Length of Slot (S_LN), respectively, and define the lengths of a virtual slot and a slot that are considered in each ranging session.

A ninth field is an Address/ID and is related to slot allocation. The ninth field is therefore used when Cast Mode (CM)=01 and Multicast Mode (MM)=1 (Multicast-Scheduled). This field informs an ID/MAC address of a responder that is allocated for each virtual slot.

A tenth field is a Number of Ranging Sessions (N_RS), and defines the number of ranging sessions considered in a single RI interval.

An eleventh field is a Ranging Session Counter (RS_CNT), and is counter information that defines a sequential order of a ranging session within a single RI interval.

A twelfth field is a Max Number of Transmissions (N_MAX_TX), and indicates a maximum number of retrials capable of maximum back-off when a collision occurs due to transmission by a responder according to a contention method in the case of broadcast where Cast Mode (CM)=10.

A thirteenth field is a Channel for Next Ranging Interval (CH_NEXT_RI) and indicates a channel number that is to be used in a next RI interval. A fourteenth field is a Preamble for Next Ranging Interval (PR_NEXT_RI) and indicates a preamble code index that is to be used in a next RI interval.

A fifteenth field is a Period between Sessions (P_RS), and indicates a period between sessions within a single RI. Accordingly, two electronic devices enter a sleep mode by a duration corresponding to the Period between Sessions ranging from when a ranging session ends until a next ranging session (poll message) starts.

Figure 16:
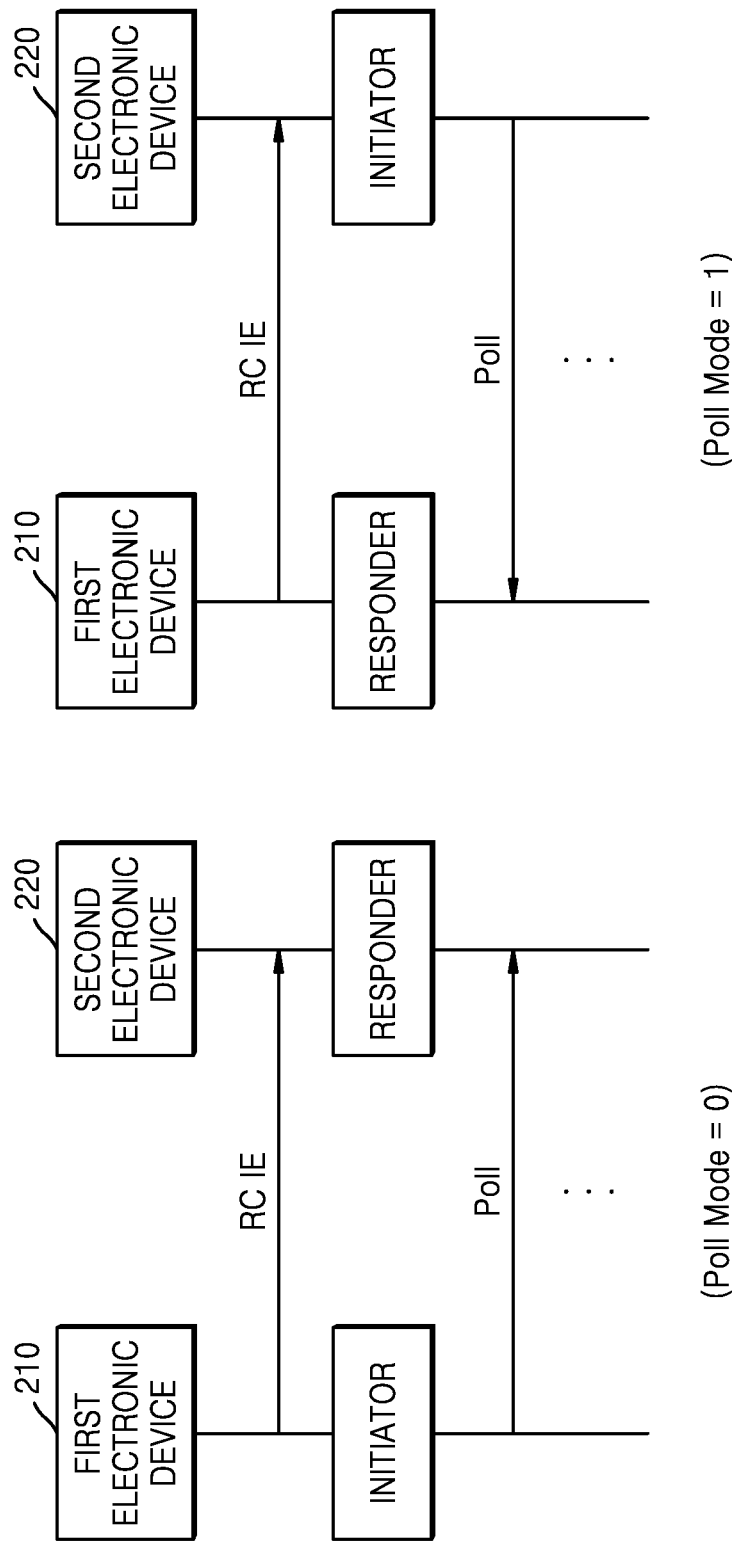
FIG. 16 is a schematic diagram for explaining a Poll Mode according to an embodiment.

FIG. 16 is a schematic diagram for explaining a Poll Mode according to an embodiment.

Referring to FIG. 16, when Poll Mode=0, the first electronic device 210, which is an electronic device having transmitted an RC IE, may operate as an initiator, and the second electronic device 220, which is an electronic device having received an RC IE, may operate as a responder. The first electronic device 210, which is an initiator, may transmit a Poll message to the second electronic device 220, which is a responder.

When Poll Mode=1, the first electronic device 210, which is an electronic device having transmitted an RC IE, may operate as a responder, and the second electronic device 220, which is an electronic device having received an RC IE, may operate as an initiator. The first electronic device 210, which is a responder, may transmit a Poll message to the second electronic device 220, which is an initiator.

Figure 17A:
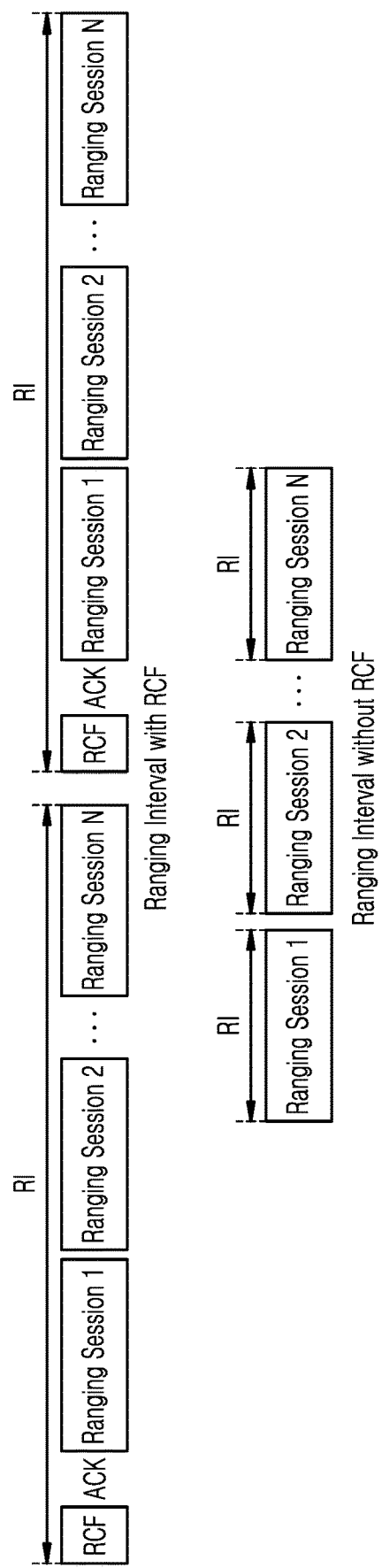
FIG. 17A schematically illustrates a structure of a ranging interval according to an embodiment.

FIG. 17A schematically illustrates a structure of a ranging interval according to an embodiment.

According to an embodiment, a plurality of responders may exist, and a plurality of ranging rounds may exist. In this case, power efficiency of an electronic device and network efficiency may increase via content fields of an RC IE and a Payload IE defined according to an embodiment.

The RC IE is information that an electronic device (controller) for ranging control transmits to other electronic devices (controlee). An initiator transmits an RC IE before transmitting a first poll message, to thereby share, with a responder, pieces of information necessary for performing a ranging operation.

A ranging procedure may be executed in units of ranging intervals (RIs). As illustrated in FIG. 17A, an RI operates with a frame (RCF) transmitting an RC IE and one or more ranging sessions.

Figure 17B:
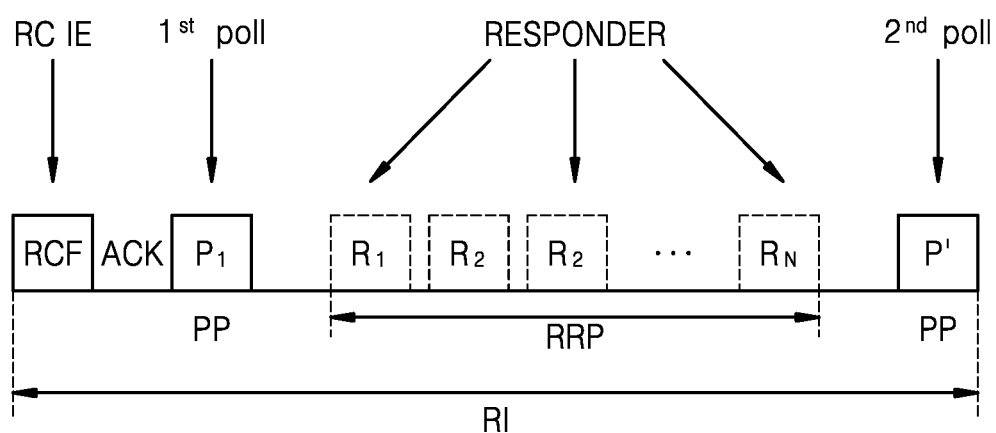
FIG. 17B is a diagram for explaining, in detail, a ranging session according to an embodiment.

FIG. 17B is a diagram for explaining, in detail, a ranging session according to an embodiment.

As shown in FIG. 17B, in a broadcast/multicast operation, a ranging session may include one or more poll messages (polling period: PP) and one or more ranging response messages (ranging response period: RRP). When each ranging session is multicast/broadcast ranging, a virtual slot enabling each responder to respond to a poll message transmitted by an initiator may be considered. This slot is defined based on an RCF message and is not predetermined and does not require synchronization.

FIG. 17B illustrates that one ranging session is considered in an RI.

In the case of multicast/broadcast ranging, a virtual slot enabling each responder to respond to a poll message transmitted by an initiator may be considered. A slot may be defined via a Poll message.

When Cast mode=01 (Broadcast) or Cast mode=10 (multicast-contention), a virtual slot is not allocated to each responder. In detail, when Cast mode=01 (Broadcast) or Cast mode=10 (multicast-contention), a virtual slot $R_1$, a virtual slot $R_2$, and a virtual slot $R_N$ are not allocated to a plurality of responders. Accordingly, a response message is transmitted within a virtual slot according to a contention method.

When Cast mode=11 (multicast-scheduled), a virtual slot is allocated to each responder. In detail, when Cast mode=11 (multicast-scheduled), the virtual slot $R_1$, the virtual slot $R_2$, and the virtual slot $R_N$ are allocated to a plurality of responders. Accordingly, a response message is transmitted within a virtual slot according to a non-contention method.

Figure 18:
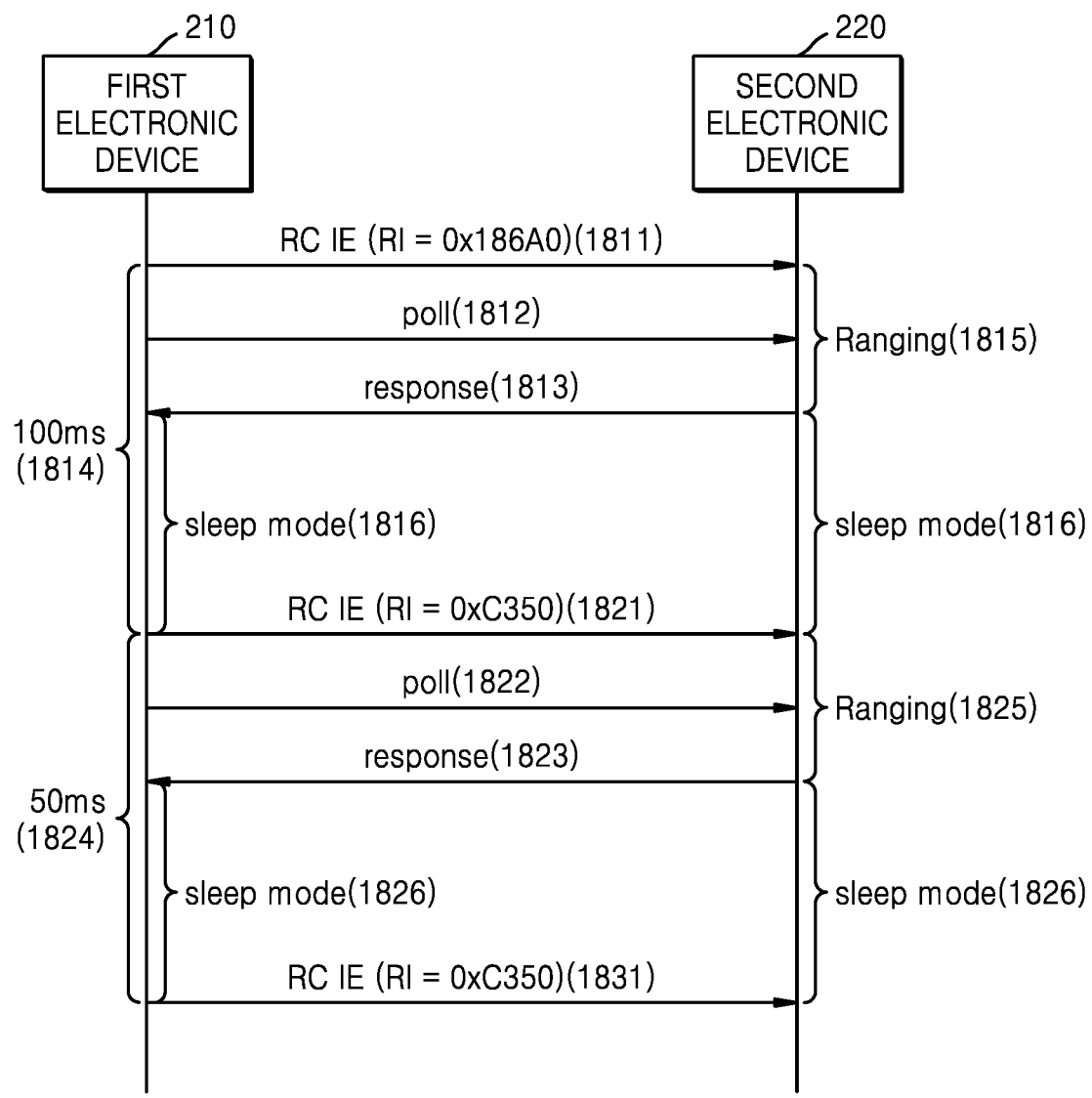
FIG. 18 is a diagram for explaining, in detail, a Ranging Interval (RI) field that determines a time interval until a next ranging control frame (RCF) is transmitted, according to an embodiment.

FIG. 18 is a diagram for explaining, in detail, the Ranging Interval (RI) field that determines a time interval until a next RCF is transmitted, according to an embodiment.

Referring to FIG. 18, in operation 1811, the first electronic device 210 may transmit a first RC IE to the second electronic device 220. RI=0x186A0 may refer to 100 ms (1814).

In operation 1813, a corresponding ranging round may be concluded.

In operation 1816, the first electronic device 210 and the second electronic device 220 may be changed to a sleep mode.

Via operation 1821, when the first electronic device 210 transmits a second RC IE to the second electronic device 220, the first electronic device 210 and the second electronic device 220 may be changed to an active mode. RI=0xC350 may refer to 50 ms (1824).

In this case, a time interval from a time point when the first RC IE is transmitted to a time point when the second RC IE is transmitted may be defined as an RI.

The above description of FIG. 18 is applicable to a Pointer to next RC field.

Figure 19:
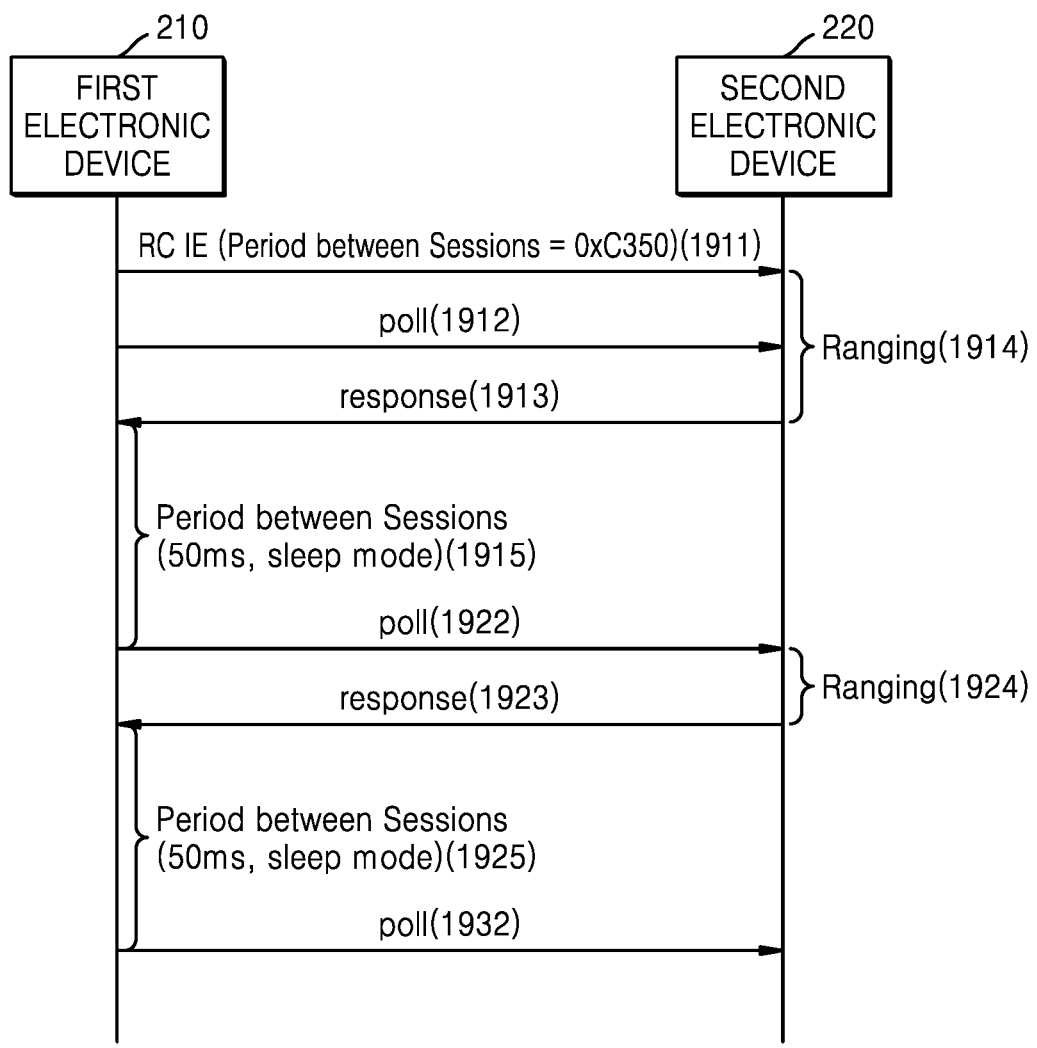
FIG. 19 s a diagram for explaining, in detail, the Period between Sessions (P_RS) according to an embodiment.

FIG. 19 s a diagram for explaining, in detail, the Period between Sessions (P_RS) according to an embodiment.

Referring to FIG. 19, the Period between Sessions (P_RS) indicates a period between sessions within a single RI. Accordingly, two electronic devices may be changed to a sleep mode by a duration corresponding to the Period between Sessions ranging from when a ranging session ends until a next ranging session (poll message) starts. An illustration thereof is expressed in a figure below.

The first electronic device 210 may transmit an RC IE including Period between Sessions (P_RS) information to the second electronic device 220. At this time, in contrast with the illustration of FIG. 18, an RC IE may be transmitted only once at first.

Via the Period between Sessions (P_RS) information, the first electronic device 210 and the second electronic device 220 may be changed to a sleep mode until a time point 1922 when a poll message is transmitted, which is a time point when a next ranging session starts.

When the Period between Sessions (P_RS) is used, this may refer to a case where a ranging session exists periodically.

The above detailed description of FIG. 19 is applicable to Period between Rounds. When Period between Rounds is used, the Pointer to next RC field may not be used.

FIG. 20A is a diagram for explaining RC that is set in a Multicast-Scheduled SS-TWR operation according to an embodiment.

Referring to FIG. 20A, Poll Mode 2001 is a field that determines whether a subject to transmit a Poll message in a ranging operation is an electronic device having transmitted an RC IE (Poll Mode: 0) or an electronic device having received the RC IE (Poll Mode: 1). The electronic device having transmitted an RC IERC is referred to as a controller. In the illustration of FIG. 20A, because Poll Mode=0, the subject to transmit a Poll message is a controller.

A Secure Mode 2002 is a field that determines whether a ranging operation by electronic devices is a normal ranging mode (Secure Mode: 0) or a secure ranging mode (Secure Mode: 1). Because Secure Mode=0 in the illustration of FIG. 20A, a ranging operation is a normal ranging mode.

A Cast Mode 2003 is a field that determines one cast mode from among a unicast mode (Cast Mode: 00), a broadcast mode (Cast Mode: 01), a multicast-contention mode (Cast Mode: 10), and a multicast-scheduled mode (Cast Mode: 11). Because Cast Mode=11 in the illustration of FIG. 20A, the determined cast mode is a multicast-scheduled mode.

A Ranging Mode 2004 is a field that determines one of an SS-TWR ranging mode (Ranging Mode: 0) or a DS-TWR ranging mode (Ranging Mode: 1). Because Ranging Mode=0 in the illustration of FIG. 20A, the determined ranging mode is an SS-TWR mode.

A Pointer to next Ranging Control (RC) 2005 is a field that determines a time interval until a next RC IE is transmitted. In the illustration of FIG. 20A, the Pointer to next RC 2005 may be expressed as '0x2710'.

A Number of Slots 2006 is a field that determines the number of slots or virtual slots. In the illustration of FIG. 20A, the Number of Slots 2006 may be expressed as 'N+2', wherein N may refer to the number of responders.

A Length of Slot 2007 is a field that determines a length of a virtual slot. In the illustration of FIG. 20A, the Length of Slot 2007 may be expressed as '0x32'.

A Slot Allocation 2008 is a field for allocation information about the virtual slot. The Slot Allocation 2008 may include information about an ID or MAC address of a responder that is allocated for each virtual slot. In the illustration of FIG. 20A, '0x325041592E5359532E4444463031' and '0x325041592E5359532E4444463054' are illustrated as an example of the ID or MAC address of the responder.

A Channel Number 2009 is a field including information about a number of a channel via which data is transmitted and received. In the illustration of FIG. 20A, '0x09' is illustrated as an example of the Channel Number 2009.

A Preamble Code Index 2010 indicates a preamble code that a plurality of electronic devices are to use in a UWB. In the illustration of FIG. 20A, '0x03' is illustrated as an example of the Preamble Code Index 2010.

FIG. 20B is a diagram for explaining RC that is set in a Multicast-Scheduled SS-TWR operation according to an embodiment.

The descriptions given above with reference to FIG. 20A are applicable to FIG. 20B according to the same principle.

FIG. 20B is an illustration when multicast-scheduled optimized SS-TWR normal ranging is performed. In this case, an initiator multicasts a poll message, to thereby increase network efficiency.

Even in the case of multicast-contention, an RC IE may be defined in the same way as in the case of multicast-scheduled. Further, even in the case of broadcast, the RC IE may be defined similar to in the case of multicast-scheduled, by an initiator broadcasting a poll message.

As an RC IE advertised by a controller is defined, multicast/broadcast optimized ranging may be supported even when an existing 802.15.8 ranging-related IE is used.

FIG. 21 is a diagram for explaining a Multicast-Scheduled SS-TWR operation according to an embodiment.

Referring to FIG. 21, in operation 2111, a first electronic device (initiator) 210 may transmit an RC IE to a second electronic device (responder 1) 220 and a third electronic device (responder N) 230.

In operation 2112, the first electronic device (initiator) 210 may transmit a Poll message to the second electronic device (responder 1) 220 and the third electronic device (responder N) 230.

In operation 2113, the second electronic device (responder 1) 220 may transmit a Response message to the first electronic device (initiator) 210.

In operation 2114, the third electronic device (responder N) 230 may transmit a Response message to the first electronic device (initiator) 210.

In operation 2121, the first electronic device (initiator) 210 may transmit an RC IE to the second electronic device (responder 1) 220 and the third electronic device (responder N) 230.

In the illustration of FIG. 21, an initiator multicasts a poll message to thereby increase network efficiency. Even in the case of multicast-contention, the descriptions given above may be defined. In the case of multicast-contention, response messages may contend with each other in a virtual slot. Further, even in the case of broadcast, the descriptions given above may be defined by an initiator broadcasting a poll message (including a 2nd poll message).

FIG. 22A is a diagram for explaining RC that is set in a Multicast-Scheduled DS-TWR operation according to an embodiment.

Referring to FIG. 22A, a Poll Mode 2201 is a field that determines whether a subject to transmit a Poll message in a ranging operation is an electronic device having transmitted an RC IE (Poll Mode: 0) or an electronic device having received the RC IE (Poll Mode: 1). The electronic device having transmitted an RC IE is referred to as a controller. In the example of FIG. 22A, because Poll Mode=0, the subject to transmit a Poll message is a controller.

A Secure Mode 2202 is a field that determines whether a ranging operation by electronic devices is a normal ranging mode (Secure Mode: 0) or a secure ranging mode (Secure Mode: 1). Because Secure Mode=0 in the example of FIG. 22A, a ranging operation is a normal ranging mode.

A Cast Mode 2203 is a field that determines one cast mode from among a unicast mode (Cast Mode: 00), a broadcast mode (Cast Mode: 01), a multicast-contention mode (Cast Mode: 10), and a multicast-scheduled mode (Cast Mode: 11). Because Cast Mode=11 in the example of FIG. 22A, the determined cast mode is a multicast-scheduled mode.

A Ranging Mode 2204 is a field that determines one of an SS-TWR ranging mode (Ranging Mode: 0) or a DS-TWR ranging mode (Ranging Mode: 1). Because Ranging Mode=1 in the example of FIG. 22A, the determined ranging mode is a DS-TWR mode.

A Pointer to next Ranging Control (RC) 2205 is a field that determines a time interval until a next RC IE is transmitted. In the example of FIG. 22A, the Pointer to next RC 2205 may be expressed as '0x2710'.

A Number of Slots 2206 is a field that determines the number of slots or virtual slots. In the example of FIG. 22A, the Number of Slots 2206 may be expressed as 'N+3', wherein N may refer to the number of responders.

A Length of Slot 2207 is a field that determines a length of a virtual slot. In the example of FIG. 22A, the Length of Slot 2207 may be expressed as '0x32'.

A Slot Allocation 2208 is a field for allocation information about the virtual slot. The Slot Allocation 2208 may include information about an ID or MAC address of a responder that is allocated for each virtual slot. In FIG. 22A, '0x325041592E5359532E4444463031' and '0x325041592E5359532E4444463054' are illustrated as an example of the ID or MAC address of the responder.

A Channel Number 2209 is a field including information about a number of a channel via which data is transmitted and received. In FIG. 22A, '0x09' is illustrated as an example of the Channel Number 2209.

A Preamble Code Index 2210 indicates a preamble code that a plurality of electronic devices are to use in a UWB. In FIG. 22A, '0x03' is illustrated as an example of the Preamble Code Index 2210.

FIG. 22B is a diagram for explaining RC that is set in a Multicast-Scheduled DS-TWR operation according to an embodiment.

The descriptions given above with reference to FIG. 22A are applicable to FIG. 22B according to the same principles.

FIG. 22B illustrates an example when multicast-scheduled optimized DS-TWR normal ranging is performed. In this case, an initiator multicasts a poll message to thereby increase network efficiency. Even in the case of multicast-contention, an RC IE may be defined in the same way as in the case of multicast-scheduled. Further, even in the case of broadcast, the RC IE may be defined similar to in the case of multicast-scheduled, by an initiator broadcasting a poll message. As an RC IE advertised by a controller is defined, multicast/broadcast optimized ranging may be supported even when an existing 802.15.8 ranging-related IE is used. (unit: us)

Figure 23:
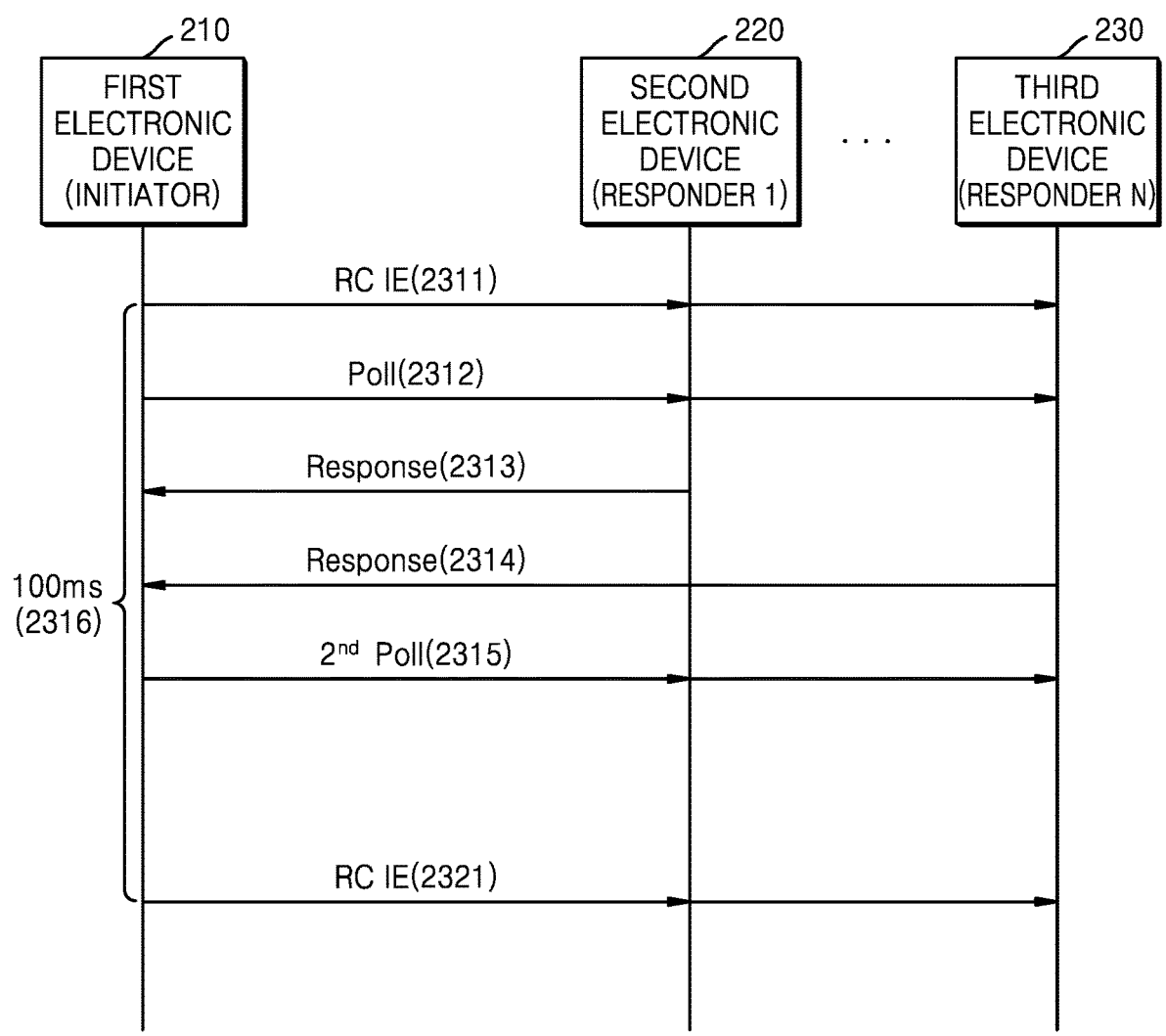
FIG. 23 is a diagram for explaining a Multicast-Scheduled DS-TWR operation according to an embodiment.

FIG. 23 is a diagram for explaining a Multicast-Scheduled DS-TWR operation according to an embodiment.

Referring to FIG. 23, in operation 2311, the first electronic device (initiator) 210 may transmit an RC IE to the second electronic device (responder 1) 220 and the third electronic device (responder N) 230.

In operation 2312, the first electronic device (initiator) 210 may transmit a Poll message to the second electronic device (responder 1) 220 and the third electronic device (responder N) 230.

In operation 2313, the second electronic device (responder 1) 220 may transmit a Response message to the first electronic device (initiator) 210.

In operation 2314, the third electronic device (responder N) 230 may transmit a Response message to the first electronic device (initiator) 210.

In operation 2315, the first electronic device (initiator) 210 may transmit a $2^{nd}$ Poll message to the second electronic device (responder 1) 220 and the third electronic device (responder N) 230.

In operation 2321, the first electronic device (initiator) 210 may transmit an RC IE to the second electronic device (responder 1) 220 and the third electronic device (responder N) 230.

In the illustration of FIG. 23, an initiator multicasts a poll message to thereby increase network efficiency. Even in the case of multicast-contention, the descriptions given above may be defined. In the case of multicast-contention, response messages may contend with each other in a virtual slot. Further, even in the case of broadcast, the descriptions given above may be defined by an initiator broadcasting a poll message (including the $2^{nd}$ poll message).

FIG. 24A is a diagram for explaining an embodiment in which a Pointer to next Ranging Control field includes a unit time field and a field of a multiple of a unit time.

Referring to FIG. 24A, a Time Unit for Pointer to next Ranging Control (RC) 2405 is a field that determines a unit of a time interval until a next RC IE is transmitted. In detail, via the Time Unit for Pointer to next RC 2405, a slot length included in an RC IE or a round length (slot length×number of slots) capable of being calculated from the slot length and the number of slots may be selected as unit time.

When the Time Unit for Pointer to next RC 2405 is 00, the unit of the time interval until a next RC IE is transmitted may be time. When the Time Unit for Pointer to next Ranging Control (RC) 2405 is 01, the unit of the time interval until a next RC IE is transmitted may be the length of a slot. When the Time Unit for Pointer to next Ranging Control (RC) 2405 is 10, the unit of the time interval until a next RC IE is transmitted may be the length of a round.

A Pointer to next Ranging Control (RC) 2406 is a field that determines a multiple of the Time Unit for Pointer to next RC 2405.

When the Time Unit for Pointer to next RC 2405 is 00 and the Pointer to next RC 2406 is 100, the time interval until a next RC IE is transmitted may be 100×10 us=1000 us.

When the Time Unit for Pointer to next RC 2405 is 01 and the Pointer to next RC 2406 is 100, assuming that the length of a slot is 1 ms, the time interval until a next RC IE is transmitted may be 100×1 ms=100 ms.

When the Time Unit for Pointer to next RC 2405 is 10 and the Pointer to next RC 2406 is 100, assuming that the number of slots is 10, the time interval until a next RC IE is transmitted may be 100×1 ms×10=1000 ms.

The length of a slot and the number of slots, which are provided by the RC IE, may change dynamically. Thus, according to the method of transmitting an RC IE illustrated in FIG. 24A, a time of a relatively large unit (e.g.: Slot length=1 ms) may be utilized, compared to the method of transmitting an RC IE using a predetermined and fixed unit time. The method of transmitting an RC IE illustrated in FIG. 24A is favorable to RC transmission with a relatively long period.

FIG. 24B is a diagram for explaining, in detail, a content field format of an RC IE including an RI field and a Time Unit for RI field, according to an embodiment.

The descriptions given above with reference to FIG. 24A are applicable to FIG. 24B according to the same principles.

Referring to FIG. 24B, RI information is provided in the form of a multiple on the premise that a unit time is predetermined (e.g., 1 us).

The Time Unit for RI field enables a slot length included in an RC IE or a session length (Slot length×Number of Slots) capable of being calculated from the length of a slot and the number of slots to be selected as a unit time.

The RI field may express an RI, based on a multiple of the selected unit time.

The length of a slot and the number of slots, which are provided by the RC IE, may change dynamically. Thus, according to the method of transmitting an RC IE illustrated in FIG. 24B, a time of a relatively large unit (e.g.: Slot length=1 ms) may be utilized, compared to the method of transmitting an RC IE using a predetermined and fixed unit time. The method of transmitting an RC IE illustrated in FIG. 24B is favorable to RC transmission with a relatively long period.

When a Time Unit for RI is 00 and an RI is 100, 100×1 us=100 us.

When the Time Unit for RI is 01 and the RI is 100, assuming that the length of a slot is 1 ms, 100×1 ms=100 ms in the above illustration.

When the Time Unit for RI is 10 and the RI is 100, assuming that the length of a slot is 1 ms and the number of slots is 10, 100×1 ms×10=1000 ms.

Figure 25:
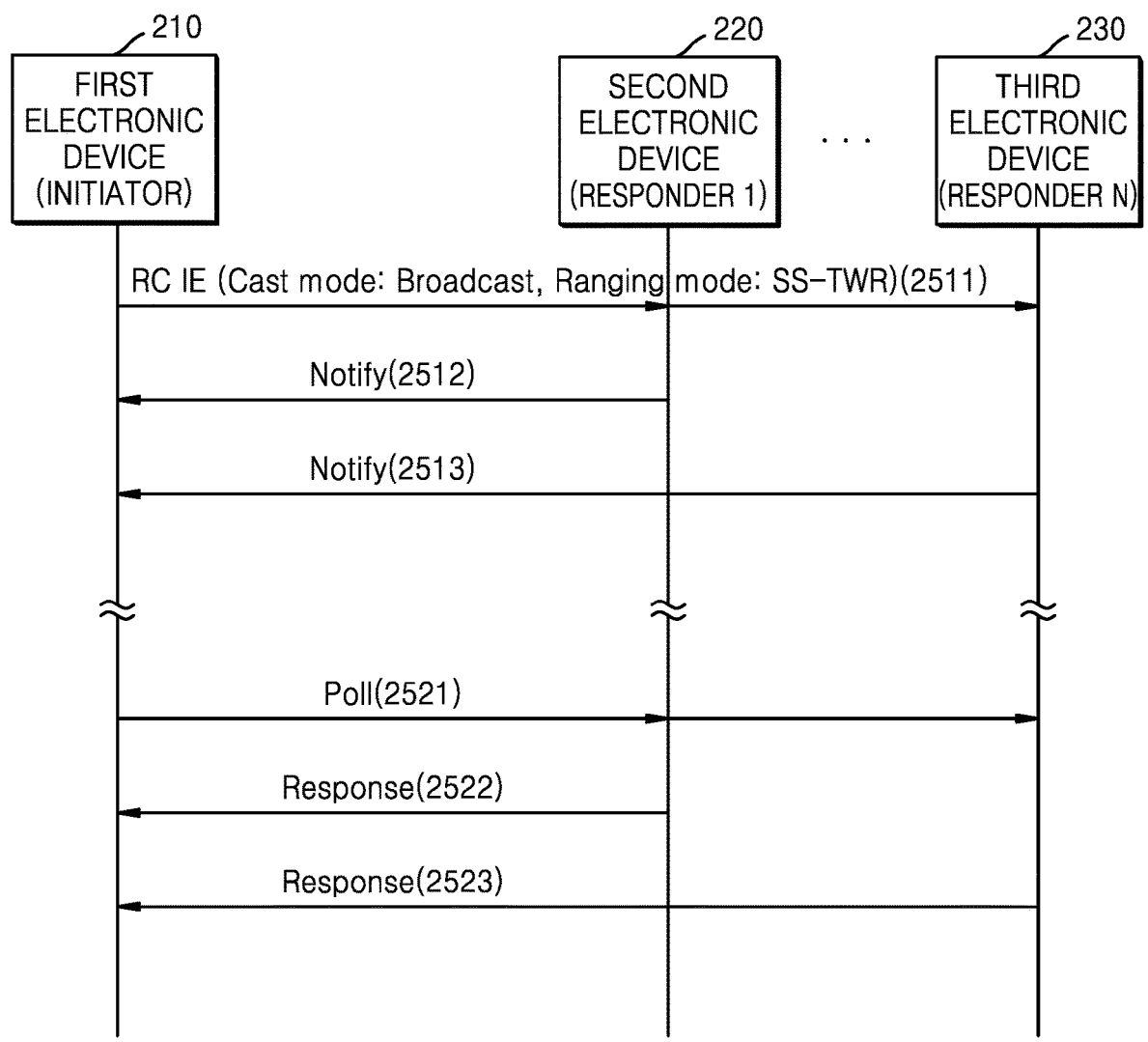
FIG. 25 is a diagram for explaining an embodiment regarding a broadcast in which an initiator and a responder do not share their pieces of ID/Address information.

FIG. 25 is a diagram for explaining an embodiment regarding broadcast in which an initiator and a responder do not share their pieces of ID/Address information.

As described above with reference to FIG. 12, responders may previously share the time to transmit a response message.

An initiator may transmit, to a responder, an RC IE including information indicating that a cast mode of a ranging round is broadcast and a ranging mode is SS-TWR.

In response to the RC IE, the responder may transmit, to the initiator, a Notify message including RPRT IE information indicating a time period during which a reply time is transmitted. Accordingly, the initiator, which is to transmit an RPRT IE frame, may be scheduled. Furthermore, use of broadcast SS-TWR may enable 2*N+2 message transmissions, and thus network efficiency may increase.

Referring to FIG. 24, in operation 2511, the first electronic device (initiator) 210 may transmit an RC IE to the second electronic device (responder 1) 220 and the third electronic device (responder N) 230. The RC IE may include information indicating that a cast mode is a broadcast mode and a ranging mode is SS-TWR.

In operation 2512, the second electronic device (Responder 1) 220 may previously notify the first electronic device (initiator) 210 of a time period during which a frame including $T_{reply}$ information is transmitted.

In operation 2513, the third electronic device (Responder N) 230 may previously notify the first electronic device (initiator) 210 of a time period during which a frame including $T_{reply}$ information is transmitted.

In operation 2521, the first electronic device (initiator) 210 may transmit a Poll message to the second electronic device (responder 1) 220 and the third electronic device (responder N) 230.

In operation 2522, the second electronic device (responder 1) 220 may transmit a Response message to the first electronic device (initiator) 210.

In operation 2523, the third electronic device (responder N) 230 may transmit a Response message to the first electronic device (initiator) 210.

Figure 26A:
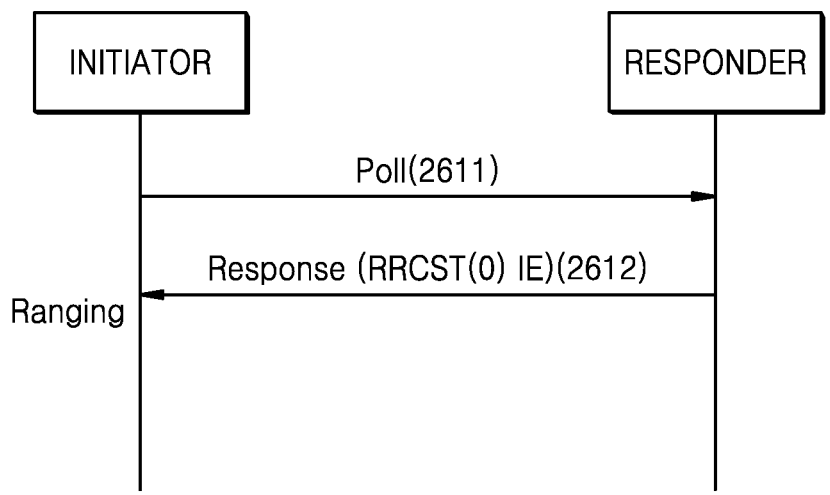
FIG. 26A is a diagram for explaining a ranging operation by an initiator and a responder in SS-TWR according to an embodiment.
Figure 26B:
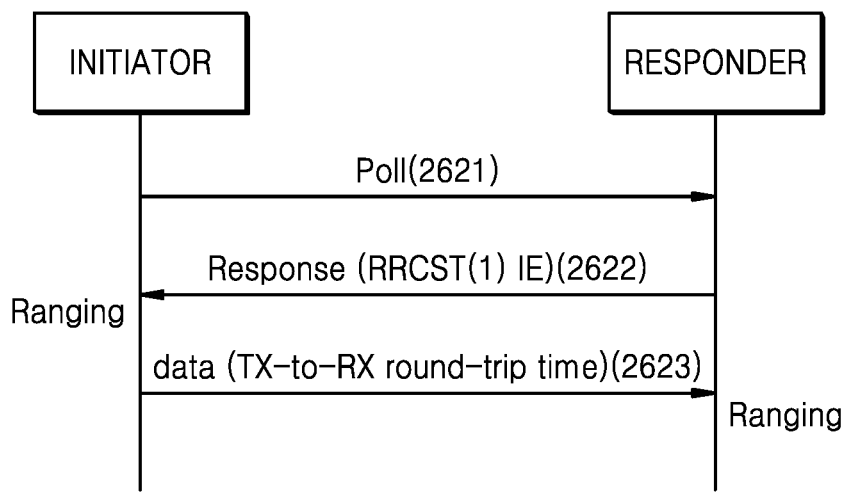
FIG. 26B is a diagram for explaining a ranging operation by an initiator and a responder in SS-TWR according to an embodiment.
Figures 26C, 27:
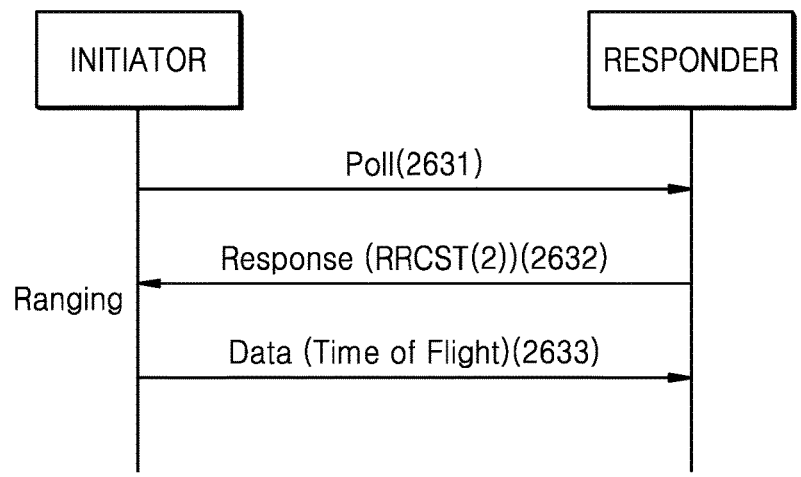
FIG. 26C is a diagram for explaining a ranging operation by an initiator and a responder in SS-TWR according to an embodiment.
FIG. 27 is a diagram for explaining a ranging operation by both an initiator and a responder in SS-TWR, according to an embodiment.

FIGS. 26A through 26C are diagrams for explaining embodiments of a ranging operation by an initiator and a responder in SS-TWR according to an embodiment.

The initiator and the responder of FIGS. 26A through 26C may perform an operation, based on a Ranging Report Control Single-Sided TWR IE (RRCST IE) which is described below with reference to FIG. 27. As is described below with reference to FIG. 27, RRCST(0), RRCST(1), and RRCST(2) may be defined.

FIG. 26A is a schematic diagram illustrating a ranging operation performed between the initiator and the responder via RRCST(0).

Referring to FIG. 26A, in operation 2611, the initiator may transmit a Poll message to the responder.

In operation 2612, the responder may transmit a Response message including RRCST(0) to the initiator.

FIG. 26B is a schematic diagram illustrating a ranging operation performed between the initiator and the responder via RRCST(1).

Referring to FIG. 26B, in operation 2621, the initiator may transmit a Poll message to the responder.

In operation 2622, the responder may transmit a Response message including RRCST(1) to the initiator.

In operation 2623, the initiator may transmit a TX-to-RX roundtrip time to the responder.

FIG. 26C is a schematic diagram illustrating a ranging operation performed between the initiator and the responder via RRCST(2).

Referring to FIG. 26C, in operation 2631, the initiator may transmit a Poll message to the responder.

In operation 2632, the responder may transmit a Response message including RRCST(2) to the initiator.

In operation 2633, the initiator may transmit a ranging result (ToF) to the responder.

FIG. 27 is a diagram for explaining a ranging operation by both an initiator and a responder in SS-TWR according to an embodiment.

The RRCST IE is an IE defined such that both an initiator and a responder may perform ranging in SS-TWR according to an embodiment.

Referring to FIG. 27, a frame including RRCST(0) indicates that a reception side does not require a TX-to-RX roundtrip time and a ranging result. That is, this frame indicates that the responding end does not require TX-to-RX roundtrip time and ranging result.

A frame including RRCST(1) indicates that the reception side requires a TX-to-RX roundtrip time. That is, this frame indicates that the responding end requires TX-to-RX roundtrip time.

A frame including RRCST(2) indicates that the reception side requires a ranging result when exchange is terminated. That is, this frame indicates that the responding end requires ranging result at the end of exchange.

Figure 28A:
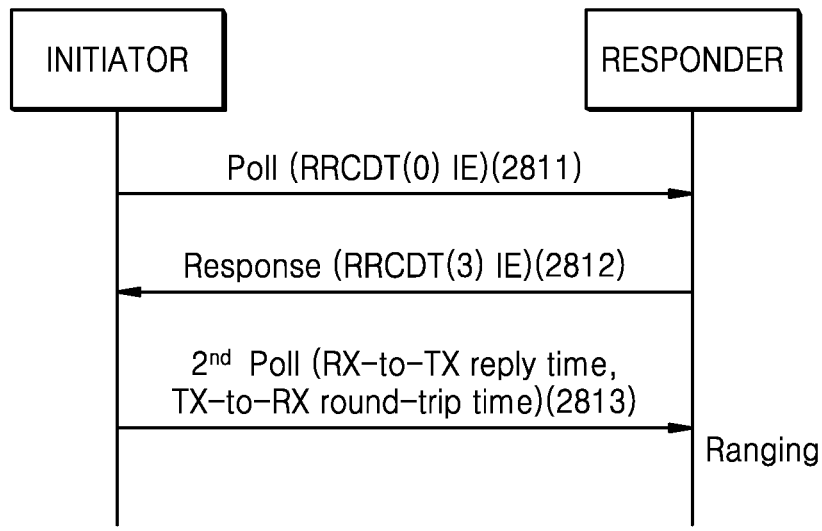
FIG. 28A is a diagram for explaining a ranging operation by both an initiator and a responder in DS-TWR, according to an embodiment.
Figure 28B:
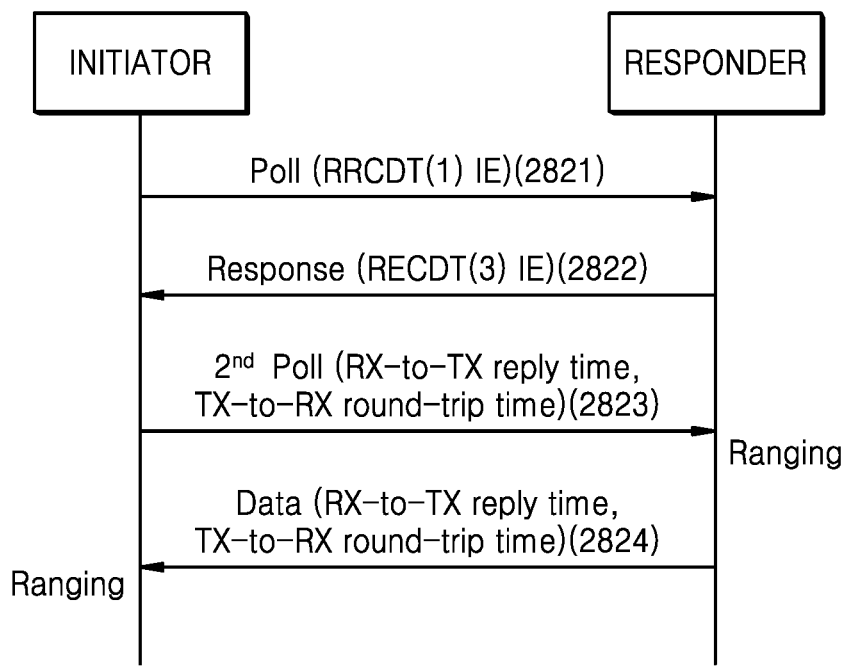
FIG. 28B is a diagram for explaining a ranging operation by both an initiator and a responder in DS-TWR, according to an embodiment.

FIGS. 28A through 28C are diagrams for explaining embodiments of a ranging operation by both an initiator and a responder in DS-TWR.

The initiator and the responder of FIGS. 28A through 28C may perform an operation, based on a Ranging Report Control Double-Sided TWR IE (RRCDT IE) which is described below with reference to FIG. 29. As is described below with reference to FIG. 29, RRCDT(0), RRCDT(1), RRCDT(2), and RRCDT(3) may be defined.

FIG. 28A is a schematic diagram illustrating a ranging operation performed between the initiator and the responder via RRCDT(0) and RRCDT(3).

Referring to FIG. 28A, in operation 2811, the initiator may transmit a Poll message including RRCDT(0) to the responder.

In operation 2812, the responder may transmit a Response message including RRCDT(3) to the initiator.

In operation 28B, the initiator may transmit a $2^{nd}$ Poll message to the responder. The $2^{nd}$ Poll message may include an RX-to-TX reply time and a TX-to-RX roundtrip time.

FIG. 28B is a schematic diagram illustrating a ranging operation performed between the initiator and the responder via RRCDT(1) and RRCDT(3).

Referring to FIG. 28B, in operation 2821, the initiator may transmit a Poll message including RRCDT(1) to the responder.

In operation 2822, the responder may transmit a Response message including RRCDT(3) to the initiator.

In operation 2823, the initiator may transmit a $2^{nd}$ Poll message to the responder. The $2^{nd}$ Poll message may include an RX-to-TX reply time and a TX-to-RX roundtrip time.

In operation 2824, the responder may transmit a Data message to the initiator. The Data message may include an RX-to-TX reply time and a TX-to-RX roundtrip time.

FIG. 28C is a schematic diagram illustrating a ranging operation performed between the initiator and the responder via RRCDT(2) and RRCDT(3).

Referring to FIG. 28C, in operation 2831, the initiator may transmit a Poll message including RRCDT(2) to the responder.

In operation 2832, the responder may transmit a Response message including RRCDT(3) to the initiator.

In operation 2833, the initiator may transmit a $2^{nd}$ Poll message to the responder. The $2^{nd}$ Poll message may include an RX-to-TX reply time and a TX-to-RX roundtrip time.

In operation 2834, the responder may transmit a Data message to the initiator. The Data message may include a ranging result (ToF).

FIG. 29 is a diagram for explaining an embodiment of a ranging operation by both an initiator and a responder in DS-TWR according to an embodiment.

The RRCDT IE is an IE defined such that both the initiator and the responder may perform ranging in the DS-TWR according to an embodiment.

Referring to FIG. 29, a frame including RRCDT(0) initiates DS-TWR, and indicates that an initiating side does not require a first reply time, a second TX-to-RX roundtrip time, and a ranging result. That is, this frame is initiating DS-TWR and indicates that the initiating end does not require $1^{st}$ reply time, $2^{nd}$ TX-to-RX roundtrip time and the ranging result.

A frame including RRCDT(1) initiates DS-TWR, and indicates that the initiating side requires the first reply time and the second TX-to-RX roundtrip time when exchange is terminated. in other words, this frame is initiating DS-TWR and indicates that initiating end requires $1^{st}$ reply time and $2^{nd}$ TX-to-RX roundtrip time at the end of exchange.

A frame including RRCDT(2) initiates DS-TWR, and indicates that the initiating side requires the ranging result when exchange is terminated. That is, this frame is initiating DS-TWR and indicates that initiating end requires ranging result at the end of exchange.)

A frame including RRCDT(3) continues DS-TWR, and indicates that a reception side requests the second TX-to-RX roundtrip time to be measured. That is, this frame is continuing the DS-TWR and indicates the responding end requests for the 2nd TX-to-RX roundtrip measurement.)

FIGS. 30A through 30C are tables schematically illustrating correction information for multicast/broadcast ranging of a Ranging-related IE defined in the existing 802.15.8 standard.

Only time information exists in the existing 802.15.8 standard. When several timestamp-related IEs are used in a single frame (i.e., there are several responders), a MAC address/device ID of a responder corresponding to each timestamp information is needed to receive each timestamp information.

Thus, according to an embodiment, a field that considers a MAC address may be added to an existing definition. Each of cases where a MAC address is 0/6/8 respectively indicates a case where no MAC addresses are used, a case where 48-bit Extended Unique Identifier (EUI-48) is used according to IEEE registration authority, or a case where 64-bit extended universal identifier (EUI-64) is used according to IEEE registration authority.

FIG. 30A schematically illustrates respective structures of a Ranging Reply Time Instantaneous IE and a Ranging Reply Time Deferred IE.

The Ranging Reply Time Instantaneous IE is a difference (Reply time) between a reception time period of a ranging frame (RFRAME) recently received and a transmission time period of a ranging frame (RFRAME) desired to be currently transmitted, for each source address.

The Ranging Reply Time Deferred IE is a difference (Reply time) between a reception time period of a ranging frame (RFRAME) recently received and a transmission time period of a ranging frame for each source address.

As shown in FIG. 30A, an RX to TX Reply Time may include 4 Octets. A MAC Address may include 0, 6, or 8 Octets.

FIG. 30B schematically illustrates a structure of a Ranging Round Trip Measurement IE.

The Ranging Round Trip Measurement IE is a difference (Roundtrip time) between a transmission time period of an RFRAME initiating a round trip and a reception time period of an RFRAME for each source address, when DS-TWR is used.

As shown in FIG. 30B, a TX to RX roundtrip time may include 4 Octets. A MAC Address may include 0, 6, or 8 Octets.

FIG. 30C schematically illustrates a structure of a Ranging Time-of-flight IE.

The Ranging Time-of-flight IE indicates respective ranging result values of SS-TWR and DS-TWR.

As shown in FIG. 30C, a Time of flight may include 4 Octets. A MAC Address may include 0, 6, or 8 Octets.

FIG. 31 is a table schematically illustrating a content field format of an RTRST IE according to an embodiment.

As shown in FIG. 31, a TX to RX roundtrip time may include 4 Octets. A MAC Address may include 0, 6, or 8 Octets.

According to an embodiment, a Ranging Time Report Single-sided TWR IE (RTRST IE) and a Ranging Time Report Double-sided TWR IE (RTRDT IE) are defined to perform ranging on TX-to-RX roundtrip time information in the case of SS-TWR and a $1^{st}$ reply time and $2^{nd}$ TX-to-RX roundtrip time information in the case of DS-TWR, and then report a result of the ranging.

According to an embodiment, in the case of SS-TWR, the Ranging Time Report Single-sided TWR IE (RTRST IE) may be used when an RRCST(1) IE is used and a Tx-to-RX roundtrip time of an initiator is reported to a responder. [RRSDT]RTRST may be used together with a timestamp-related IE for a responder other than a responder that an RTRST IE considers within a single frame. In this case (i.e., in the case of multicast/broadcast ranging SS-TWR), a content field of the RTRST IE includes a Device ID (MAC address) of a responder that has required the Tx-to-RX roundtrip time.

According to an embodiment, each of cases where an MAC address is 0/6/8 respectively indicates a case where no MAC addresses are used, a case where 48-bit Extended Unique Identifier (EUI-48) is used according to IEEE registration authority, or a case where 64-bit extended universal identifier (EUI-64) is used according to IEEE registration authority.

Figure 32A:
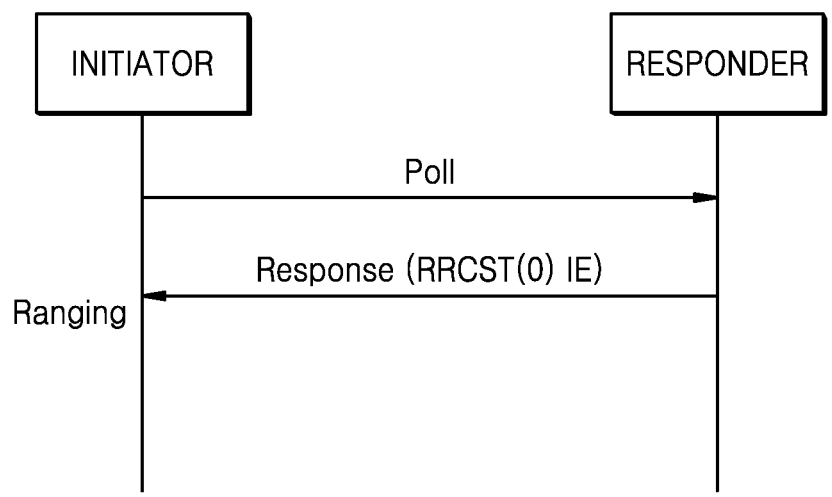
FIG. 32A is a schematic diagram for explaining ranging operations utilizing an RTRST IE in SS-TWR, according to an embodiment.
Figure 32B:
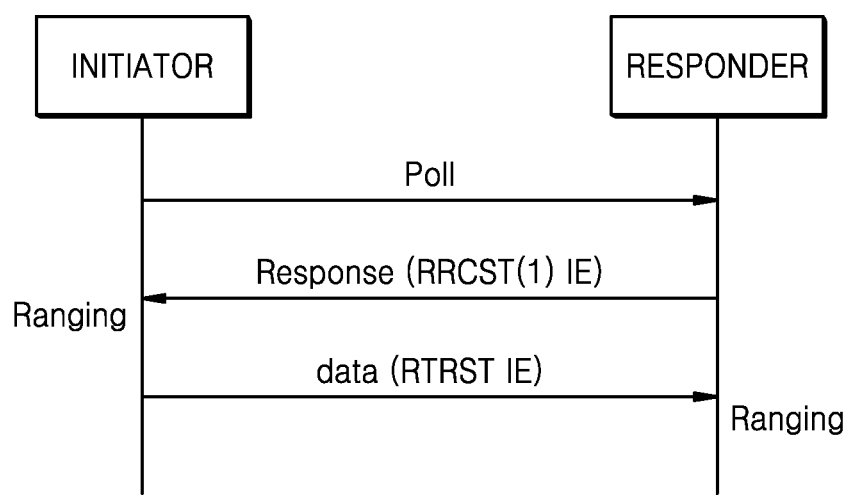
FIG. 32B is a schematic diagram for explaining ranging operations utilizing an RTRST IE in SS-TWR, according to an embodiment.
Figures 32C, 33:
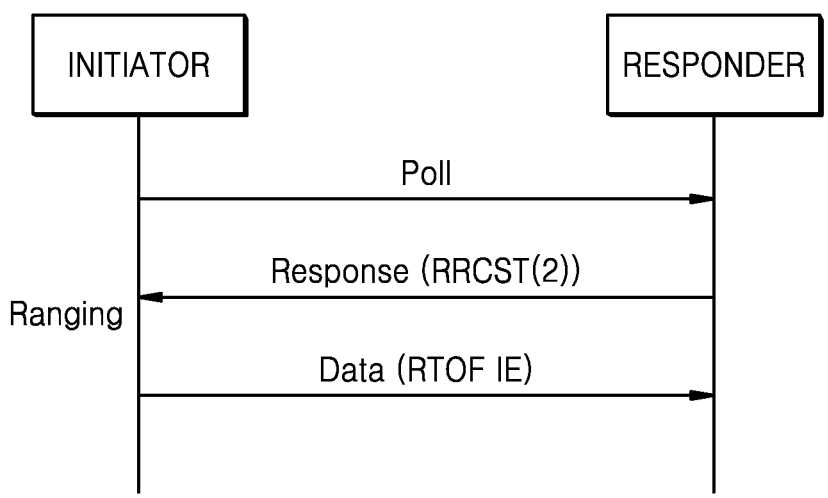
FIG. 32C is a schematic diagram for explaining ranging operations utilizing an RTRST IE in SS-TWR, according to an embodiment.
FIG. 33 is a table schematically illustrating a content field format of an Ranging Time Report Double-sided TWR IE (RTRDT IE), according to an embodiment.

FIGS. 32A through 32C are schematic diagrams for explaining ranging operations utilizing an RTRST IE in SS-TWR according to an embodiment.

An initiator and a responder of FIGS. 32A through 32C may perform an operation, based on the RTRST IE described above with reference to FIG. 31.

FIG. 32A is a schematic diagram illustrating a ranging operation performed between the initiator and the responder via RRCST(0).

Referring to FIG. 32A, the initiator may transmit a Poll message to the responder.

The responder may transmit a Response message including RRCST(0) to the initiator.

FIG. 32B is a schematic diagram illustrating a ranging operation performed between the initiator and the responder via RRCST(1) and the RTRST IE.

Referring to FIG. 32B, the initiator may transmit a Poll message to the responder.

The responder may transmit a Response message including RRCST(1) to the initiator.

The initiator may transmit a data message including the RTRST IE to the responder.

FIG. 32C is a schematic diagram illustrating a ranging operation performed between the initiator and the responder via RRCST(2).

Referring to FIG. 32C, the initiator may transmit a Poll message to the responder.

The responder may transmit a Response message including RRCST(2) to the initiator.

The initiator may transmit a ranging result (ToF) to the responder.

FIG. 33 is a table schematically illustrating a content field format of an RTRDT IE according to an embodiment.

As shown in FIG. 33, an RX to TX roundtrip time may include 4 Octets. A TX to RX roundtrip time may include 4 Octets. RTRDT may be used together with a timestamp-related IE for a responder (initiator) other than a responder (initiator) that an RTRDT IE considers within a single frame. In this case (i.e., in the case of many-to-many ranging DS-TWR), a content field of the RTRDT IE includes a Device ID (MAC address) of a responder (initiator) that has required the Tx-to-RX roundtrip time.

According to an embodiment, each of cases where an MAC address is 0/6/8 respectively indicates a case where no MAC addresses are used, a case where 48-bit Extended Unique Identifier (EUI-48) is used according to IEEE registration authority, or a case where 64-bit extended universal identifier (EUI-64) is used according to IEEE registration authority.

When DS-TWR is performed, the Ranging Time Report Double-sided TWR IE (RTRDT IE) may be used when an RRCDT(1) IE is used and the Rx-to-Tx roundtrip time and the Tx-to-Rx roundtrip time of the responder is reported to the initiator.

Figure 34A:
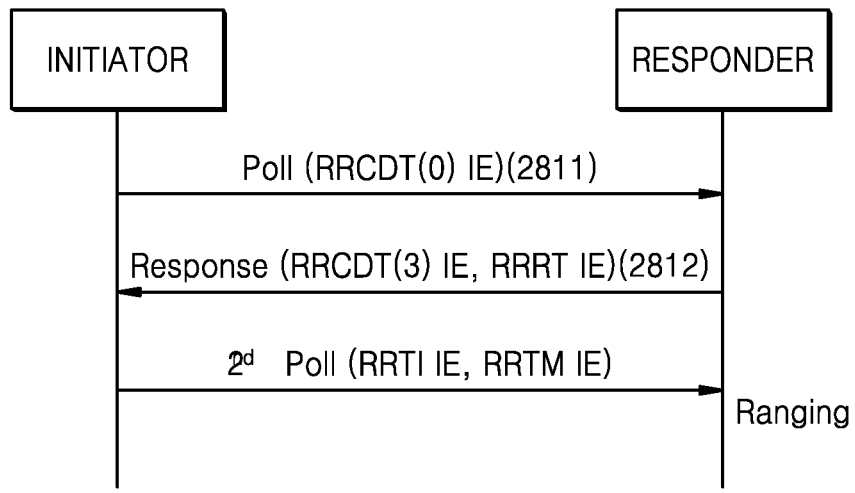
FIG. 34A is a schematic diagram for explaining ranging operations utilizing an RTRDT IE in DS-TWR, according to an embodiment.
Figure 34B:
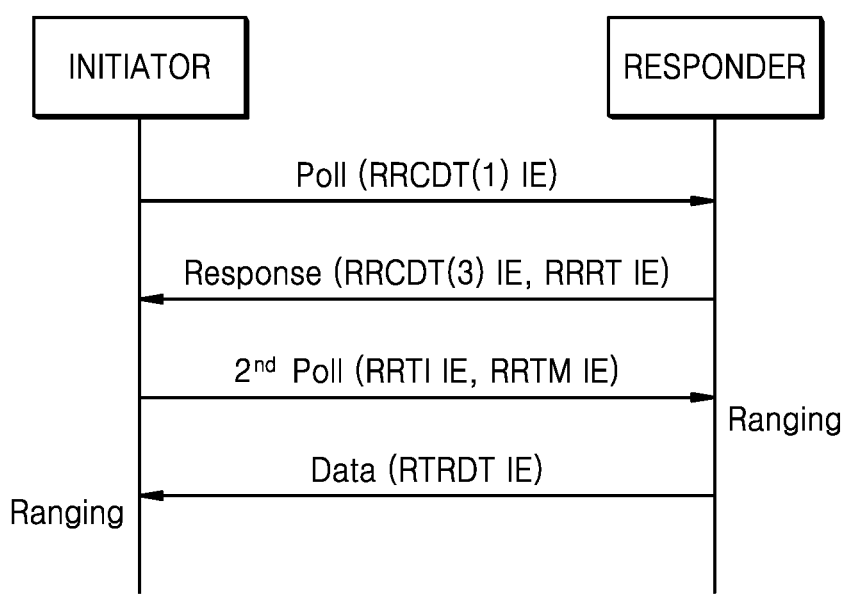
FIG. 34B is a schematic diagram for explaining ranging operations utilizing an RTRDT IE in DS-TWR, according to an embodiment.
Figure 34C:
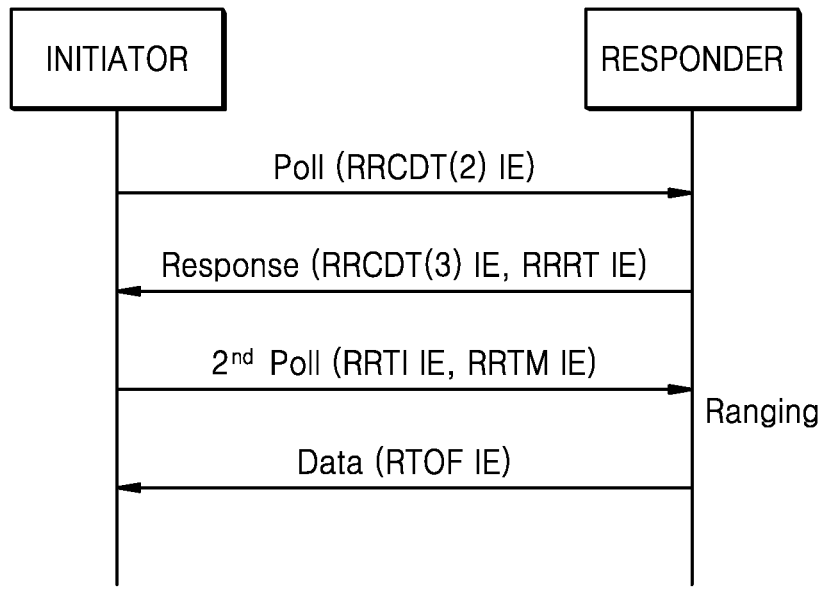
FIG. 34C is a schematic diagram for explaining ranging operations utilizing an RTRDT IE in DS-TWR, according to an embodiment.

FIGS. 34A through 34C are schematic diagrams for explaining ranging operations utilizing an RTRDT IE in DS-TWR according to an embodiment.

An initiator and a responder of FIGS. 34A through 34C may perform an operation, based on the RTRDT IE described above with reference to FIG. 33.

FIG. 34A is a schematic diagram illustrating a ranging operation performed between the initiator and the responder via RRCDT(0) and RRCDT(3).

Referring to FIG. 34A, the initiator may transmit a Poll message including RRCDT(0) to the responder.

The responder may transmit a Response message including RRCDT(3) and RRRT to the initiator.

The initiator may transmit a $2^{nd}$ Poll message to the responder. The $2^{nd}$ Poll message may include an RX-to-TX reply time and a TX-to-RX roundtrip time.

FIG. 34B is a schematic diagram illustrating a ranging operation performed between the initiator and the responder via RRCDT(1), RRCDT(3), and an RTRDT IE.

Referring to FIG. 34B, the initiator may transmit a Poll message including RRCDT(1) to the responder.

The responder may transmit a Response message including RRCDT(3) and RRRT to the initiator.

The initiator may transmit a $2^{nd}$ Poll message to the responder. The $2^{nd}$ Poll message may include an RX-to-TX reply time and a TX-to-RX roundtrip time.

The responder may transmit a data message including an RTRDT IE to the initiator.

FIG. 34C is a schematic diagram illustrating a ranging operation performed between the initiator and the responder via RRCDT(2) and RRCDT(3).

Referring to FIG. 34C, the initiator may transmit a Poll message including RRCDT(2) to the responder.

The responder may transmit a Response message including RRCDT(3) and RRRT to the initiator.

The initiator may transmit a $2^{nd}$ Poll message to the responder. The $2^{nd}$ Poll message may include an RX-to-TX reply time and a TX-to-RX roundtrip time.

The responder may transmit a Data message to the initiator. The Data message may include a ranging result (ToF).

Figure 35:
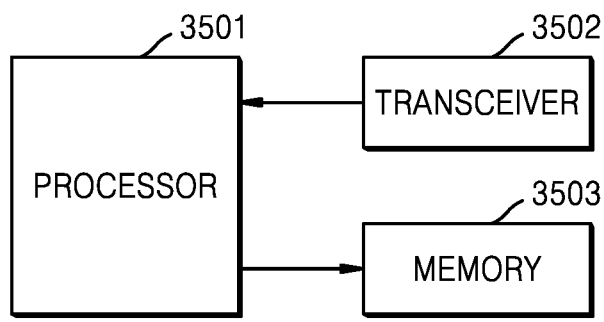
FIG. 35 is a block diagram of a configuration of an electronic device, according to an embodiment.

FIG. 35 is a block diagram of a configuration of an electronic device, according to an embodiment.

Referring to FIG. 35, the electronic device according to an embodiment may include a processor 3501, a transceiver 3502, and a memory 3503. The processor 3501 may indicate one processor or a plurality of processors, the transceiver 3502 may indicate one transceiver or a plurality of transceivers, and the memory 3503 may indicate one memory or a plurality of memories.

The processor 3501 may be an integrated circuit or at least one processor dedicated to a circuit or an application.

The processor 3501 according to an embodiment may control all operations of the electronic device. For example, the processor 3501 may control a signal flow between blocks so as to allow operations to be performed according to the aforementioned flowcharts. Also, the processor 3501 may write data to and read data from the memory 3503. In addition, the processor 3501 may perform functions of a protocol stack, which are requested or implemented by a communication standard. To this end, the processor 3501 may include at least one processor or microprocessor, or may be a part of another processor. Also, a part of the transceiver 3502 and the processor 3501 may be referred to as a communication processor (CP).

According to an embodiment, the processor 3501 may control operations of the electronic device, which are described above with reference to FIGS. 1 through 14, 15A, 15B, 16, 17A, 17B, 18, 19, 20A, 20B, 21, 22A, 22B, 23, 24A, 24B, 25, 26A through 26C, 27, 28A through 28C, 29, 30A through 30C, 31, 32A through 32C, 33, and 34A through 34C.

The transceiver 3502 according to an embodiment may perform functions for transmitting and receiving a signal via a wireless channel. For example, the transceiver 3502 may perform conversion between a baseband signal and a bit-stream based on physical layer specifications of a system. For example, for data transmission, the transceiver 3502 may generate complex symbols by encoding and modulating a transmit bit string. For data reception, the transceiver 3502 may reconstruct a received bit stream by demodulating and decoding a baseband signal. Also, the transceiver 3502 may up-convert a baseband signal into a RF band signal and then may transmit the RF band signal through an antenna, and may down-convert an RF band signal received through an antenna, into a baseband signal. Further, the transceiver 3502 may include at least one of a transmitting filter, a receiving filter, an amplifier, a mixer, an oscillator, a digital-to-analog converter (DAC), an analog-to-digital converter (ADC), or the like. Also, the transceiver 3502 may include a plurality of transmitting and receiving paths. In addition, the transceiver 3502 may include at least one antenna array including a plurality of antenna elements. In a hardware aspect, the transceiver 3502 may include a digital circuit and an analog circuit (e.g., a radio frequency integrated circuit (RFIC)). In this regard, the digital circuit and the analog circuit may be implemented as one package. Also, the transceiver 3502 may include a plurality of RF chains. The transceiver 3502 may include a first transceiver and a second transceiver. The first transceiver may support first communication, and the second transceiver may support second communication.

Although FIG. 35 illustrates one transceiver 3502, the first transceiver supporting the first communication, and the second transceiver supporting the second communication may exist as separate transceivers.

The memory 3503 according to an embodiment may store data such as basic programs, application programs, setup information or the like, for operations of the electronic device. The memory 3503 may be implemented as a volatile memory, a non-volatile memory, or a combination of a volatile memory and a non-volatile memory. The memory 3503 may provide stored data, in response to a request by the processor 3501. The memory 3503 may store at least one of information transmitted and received by the transceiver 3502 or information generated by the processor 3501.

The processor 3501 according to an embodiment may execute a program stored in the memory 3503, to transmit a ranging control message to another electronic device, transmit a ranging start message based on the ranging control message to another electronic device, and receive a ranging response message based on the ranging control message to the other electronic device.

The ranging control message may include first information used to determine a time interval from a time point when the ranging control message (e.g., first ranging control message) is transmitted to a time point when another ranging control message (e.g., second ranging control message) different from the former (e.g., first) ranging control message is transmitted.

The ranging control message may include: second information used to determine one of the time interval from the time point when the ranging control message is transmitted to the time point when the other ranging control message different from the former ranging control message is transmitted, a slot length, or a round length; and third information used to determine one of a multiple of the time interval, a multiple of the slot length, or a multiple of the round length.

The ranging control message may include: fourth information used to determine one cast mode from among unicast, broadcast, and multicast-contention, and multicast-scheduled; and fifth information used to determine one ranging operation mode from among an SS-TWR mode and a DS-TWR mode.

When the cast mode determined via the fourth information is broadcast and the ranging operation mode determined via the fifth information is an SS-TWR mode, the processor 3501 may receive sixth information (RRTI IE) that is time interval information about a time interval from a time point when the other electronic device receives the ranging start message from the electronic device to a time point when the other electronic device transmits the ranging response message to the electronic device.

When the ranging operation mode determined via the fifth information is an SS-TWR mode, the ranging response message may include seventh information (RCST IE) used to determine whether the electronic device transmits at least one of a TX-to-RX roundtrip time (RRTM) from the electronic device to the other electronic device or a Ranging Result (RTOF).

When the ranging operation mode determined via the fifth information is a DS-TWR mode, the ranging response message may include eighth information (RCDT IE) used to determine whether the other electronic device transmits at least one of the time interval information (RRTI IE) about the time interval from the time point when the other electronic device receives the ranging start message from the electronic device to the time point when the other electronic device transmits the ranging response message to the electronic device, the TX-to-RX roundtrip time (RRTM IE) from the electronic device to the other electronic device, or the Ranging Result (RTOF IE).

The at least one processor may report a roundtrip time from the electronic device to the other electronic device to the other electronic device.

The at least one processor may receive, from the other electronic device, a report about the roundtrip time from the electronic device to the other electronic device, and may be reported a roundtrip time from the other electronic device to the electronic device from the other electronic device.

The ranging control message may include ninth information used to determine a subject to transmit the ranging start message to be at least one of the electronic device or the other electronic device.

One or more methods according to embodiments described above or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments as described the specification or in the following claims.

The programs (e.g., software modules or software) may be stored in non-volatile memory (including random access memory (RAM) or flash memory), read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device performing the embodiments of the disclosure via an external port. Furthermore, a separate storage device on the communication network may access the electronic device performing the embodiments of the disclosure.

Although various embodiments have been described in detail herein above, it should be understood that many variations and modifications may be made without departing from the spirit and scope of the disclosure as defined in at least the appended claims and their equivalents. Therefore, the scope of the disclosure is defined not by the detailed description of examples but by at least the appended claims and equivalents to the appended claims.

The block diagrams as described in the disclosure may be construed by one of ordinary skill in the art as conceptual representation of circuitry for implementing principles of the disclosure. Similarly, it is also understood by one of ordinary skill in the art that any flowcharts, flow diagrams, state transitions, pseudo codes, etc., may be substantially embodied in a computer-readable medium as various processes that may be carried out by a computer or processor, whether or not the computer or the processor is explicitly shown. Accordingly, the aforementioned embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

Functions of the various elements shown in the drawings may be associated with appropriate software and thus may be provided by the use of dedicated hardware as well as hardware capable of executing the software. When provided by a processor, the functions may be provided by a single dedicated processor, a single shared processor, or a plurality of individual processors in which some of them may be shared. Also, the explicit use of the term "processor" or "controller" should not be interpreted as making exclusive reference to hardware capable of executing software, but may be construed as implicitly including, without limitation, digital signal processor (DSP) hardware, a ROM for storing software, a RAM, and a non-volatile storage device.

In the attached claims, an element represented as a unit for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intend that particular properties, structures, features, etc., are included in at least one embodiment of the principle of the disclosure. Thus, the term "an embodiment" and any other modifications provided in the specification do not necessarily refer to the same embodiment of the disclosure.

Throughout the disclosure, expressions such as "at least one of a or b" indicates only a, only b, both a and b. Additionally, throughout the disclosure, expressions such as "at least one of a, b or c" indicates only a, only b, only c, both a and b, both a and c, both b and c, all of a, b, and c, or variations thereof. Even when more or less items are enumerated, they may be clearly and expansively interpreted by one of ordinary skill in the art.

The disclosure has been particularly shown and described with reference to embodiments thereof, It is to be understood that all embodiments and conditional exemplification as disclosed in the specification are intended to assist one of ordinary skill in the art in understanding the principles and concepts of the disclosure, and thus one of ordinary skill in the art may understand that the embodiments may be modified without departing from the substantial characteristics of the disclosure. Thus, the disclosed embodiments should be considered in a descriptive sense only and not for purposes of limitation. The scope of the disclosure is defined not exclusively by the detailed description but by at least the appended claims, and all differences within the scope will be construed as being included in the disclosure.

What is claimed is:

1. An operation method of a first electronic device for transmitting and receiving data through an ultra wideband (UWB) in a wireless communication system, the operation method comprising:
    transmitting, to a second electronic device through the UWB, a first ranging control message, wherein the first ranging control message comprises information related to a time interval from a time point when the first ranging control message is transmitted to a time point when a second ranging control message, different from the first ranging control message, is transmitted;
    transmitting, to the second electronic device through the UWB, a ranging start message based on the first ranging control message; and
    receiving, from the second electronic device through the UWB, a ranging response message based on the first ranging control message,
    wherein each of the first ranging control message and the second ranging control message comprises:
        information related to a cast mode indicating that ranging following a corresponding ranging control message is a unicast mode or a multicast mode; and
        information related to a ranging operation mode indicating that the ranging following the corresponding ranging control message is a single-sided two-way ranging (SS-TWR) mode or a double-sided two-way (DS-TWR) mode.

2. The operation method of claim 1, wherein the first ranging control message further comprises:
    information related to a slot length; and
    information related to a round length.

3. The operation method of claim 1, further comprising, when the cast mode is the multicast mode and the ranging operation mode is the SS-TWR mode, receiving reply time information about a time interval from a time point when the second electronic device receives the ranging start message from the first electronic device to a time point when the second electronic device transmits the ranging response message to the first electronic device.

4. The operation method of claim 1, wherein, when the ranging operation mode is the SS-TWR mode, the ranging response message comprises:
    information related to a request to transmit a TX-to-RX roundtrip time; and
    information related to a request to transmit a Ranging Result.

5. The operation method of claim 1, wherein, when the ranging operation mode is the DS-TWR mode, the ranging response message comprises:
    information related to a request to transmit reply time information;
    information related to a request to transmit a TX-to-RX roundtrip time information; and
    information related to a request to transmit a Ranging Result.

6. The operation method of claim 4, further comprising reporting, to the second electronic device, a roundtrip time from the first electronic device to the second electronic device.

7. The operation method of claim 5, further comprising receiving a report about a reception (RX)-to-transmission (TX) reply time information of the second electronic device and a TX-to-RX roundtrip time information of the second electronic device.

8. The operation method of claim 1, wherein the first ranging control message further comprises information related to which of the first electronic device or the second electronic device is to transmit the ranging start message.

9. A first electronic device for transmitting and receiving data through an ultra wideband (UWB) in a wireless communication system, the first electronic device comprising:
    at least one transceiver;
    at least one memory storing a program; and
    at least one processor configured to execute the program to:
        transmit, through the UWB to a second electronic device via the at least one transceiver, a first ranging control message, wherein the first ranging control message comprises information related to a time interval from a time point when the first ranging control message is transmitted to a time point when a second ranging control message, different from the first ranging control message, is transmitted;

transmit, through the UWB to the second electronic device via the at least one transceiver, a ranging start message based on the first ranging control message; and receive, through the UWB from the second electronic device via the at least one transceiver, a ranging response message based on the first ranging control message, wherein each of the first ranging control message and the second ranging control message comprises:

information related to a cast mode indicating that ranging following a corresponding ranging control message is a unicast mode, or a multicast mode; and information related to a ranging operation mode indicating that the ranging following the corresponding ranging control message is a single-sided two-way ranging (SS-TWR) mode or a double-sided two-way (DS-TWR) mode.

10. The first electronic device of claim 9, wherein the first ranging control message further comprises:

information related to a slot length; and
information related to a round length.

11. The first electronic device of claim 9, wherein the at least one processor is further configured to execute the program to, when the cast mode is the broadcast mode and the ranging operation mode is the SS-TWR mode, receive via the transceiver, reply time information about a time interval from a time point when the second electronic device receives the ranging start message from the first electronic device to a time point when the second electronic device transmits the ranging response message to the first electronic device.

12. The first electronic device of claim 9, wherein, when the ranging operation mode is the SS-TWR mode, the ranging response message comprises:

information related to a request to transmit a TX-to-RX roundtrip time; and information related to a request to transmit a Ranging Result.

13. The first electronic device of claim 9, wherein, when the ranging operation mode is the DS-TWR mode, the ranging response message comprises:

information related to a request to transmit reply time information information related to a request to transmit a TX-to-RX roundtrip time information; and information related to a request to transmit a Ranging Result.

14. The first electronic device of claim 12, wherein the at least one processor is further configured to execute the program to report, to the second electronic device via the at least one transceiver, a roundtrip time from the first electronic device to the second electronic device.

15. The first electronic device of claim 13, wherein the at least one processor is further configured to execute the program to receive a report about a reception (RX)-to-transmission (TX) reply time information of the second electronic device and a TX-to-RX roundtrip time information of the second electronic device.

16. A non-transitory computer-readable recording medium having recorded thereon instructions executable by at least one processor of a first electronic device to cause the at least one processor to perform an operation method for transmitting and receiving data through an ultra wideband (UWB) in a wireless communication system, the operation method comprising:

transmitting, to a second electronic device through the UWB, a first ranging control message, wherein the first ranging control message comprises information related to a time interval from a time point when the first ranging control message is transmitted to a time point when a second ranging control message, different from the first ranging control message, is transmitted;

transmitting, to the second electronic device through the UWB, a ranging start message based on the first ranging control message; and receiving, from the second electronic device through the UWB, a ranging response message based on the first ranging control message, wherein each of the first ranging control message and the second ranging control message comprises:

information related to a cast mode indicating that ranging, following a corresponding ranging control message is a unicast mode, or a multicast mode; and information related to whether a ranging operation mode indicating that the ranging following the corresponding ranging control message is a single-sided two-way ranging (SS-TWR) mode or a double-sided two-way (DS-TWR) mode.

* * * * *